United States Patent
Ahal et al.

(10) Patent No.: US 7,844,856 B1
(45) Date of Patent: Nov. 30, 2010

(54) METHODS AND APPARATUS FOR BOTTLENECK PROCESSING IN A CONTINUOUS DATA PROTECTION SYSTEM HAVING JOURNALING

(75) Inventors: Shlomo Ahal, Tel-Aviv (IL); Assaf Natanzon, Ramat-Gan (IL); Evgeny Drukh, Rehovot (IL); Ido Singer, Nes-Ziona (IL)

(73) Assignee: EMC (Benelux) B.V., S.A.R.L. (LU)

( * ) Notice: Subject to any disclaimer, the term of this patent is extended or adjusted under 35 U.S.C. 154(b) by 279 days.

(21) Appl. No.: 11/964,193

(22) Filed: Dec. 26, 2007

(51) Int. Cl.
G06F 11/00 (2006.01)
G06F 11/34 (2006.01)

(52) U.S. Cl. .............................. 714/19; 714/15; 714/16; 714/55; 702/120; 711/161

(58) Field of Classification Search ................... 714/15, 714/16, 56, 19, 55; 702/120, 186; 711/162, 711/161
See application file for complete search history.

(56) References Cited

U.S. PATENT DOCUMENTS

| 5,388,254 | A  | * | 2/1995  | Betz et al. ....................... 714/16 |
| 7,519,628 | B1 | * | 4/2009  | Leverett ...................... 707/202 |
| 7,606,940 | B2 | * | 10/2009 | Yamagami ................... 709/246 |
| 7,757,057 | B2 | * | 7/2010  | Sangapu et al. ............. 711/162 |
| 2003/0061537 | A1 | * | 3/2003 | Cha et al. ....................... 714/16 |
| 2003/0196147 | A1 | * | 10/2003 | Hirata et al. ................... 714/42 |
| 2005/0028022 | A1 | * | 2/2005 | Amano .......................... 714/2 |
| 2005/0049924 | A1 | * | 3/2005 | DeBettencourt et al. ....... 705/21 |

* cited by examiner

*Primary Examiner*—Scott Baderman
*Assistant Examiner*—Joseph Schell
(74) *Attorney, Agent, or Firm*—Daly, Crowley, Mofford & Durkee, LLP

(57) ABSTRACT

Method and apparatus to provide bottleneck processing in a continuous data protection system having journaling. In an exemplary embodiment, system parameter information is collected and analyzed to output bottleneck information.

18 Claims, 21 Drawing Sheets

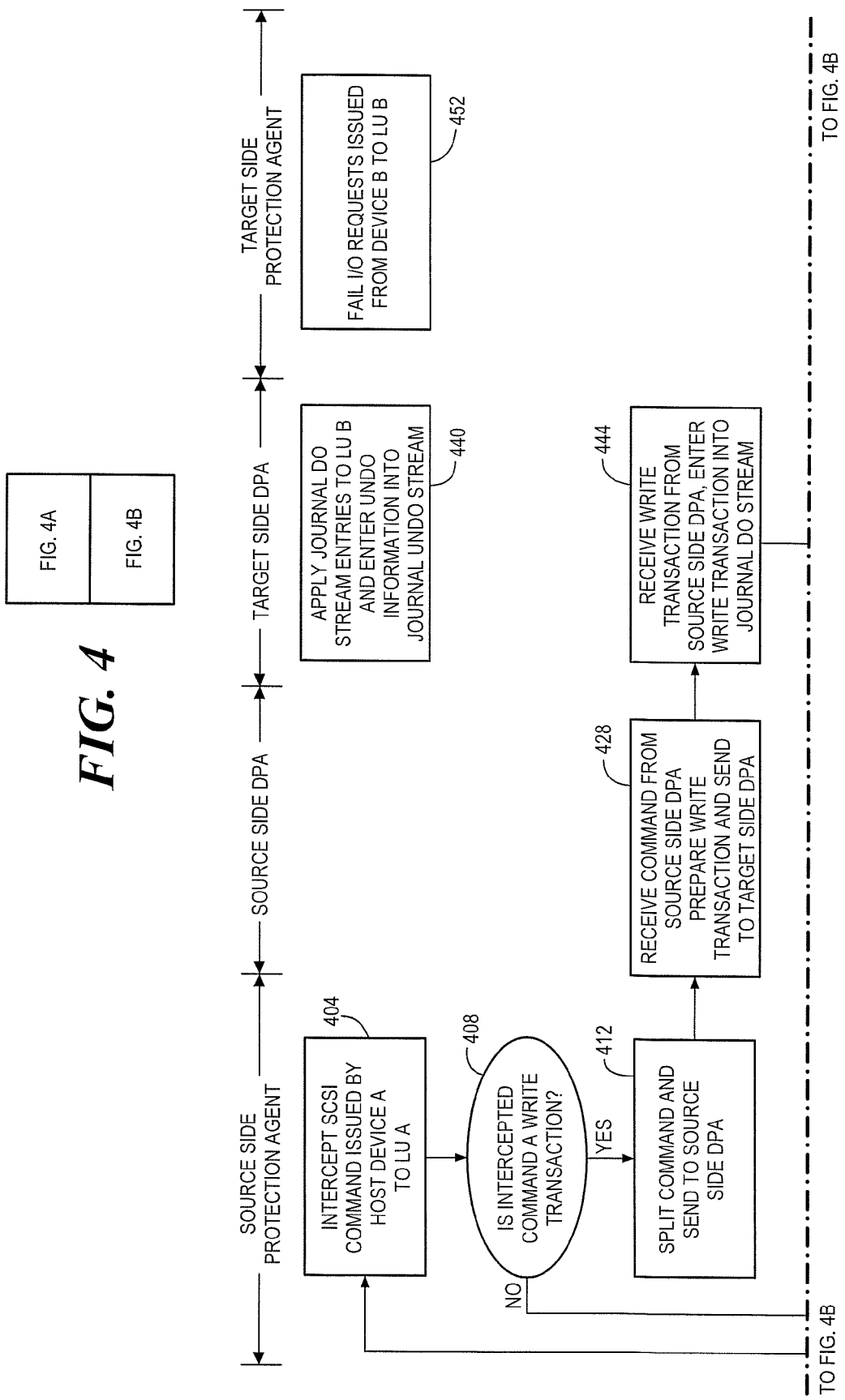

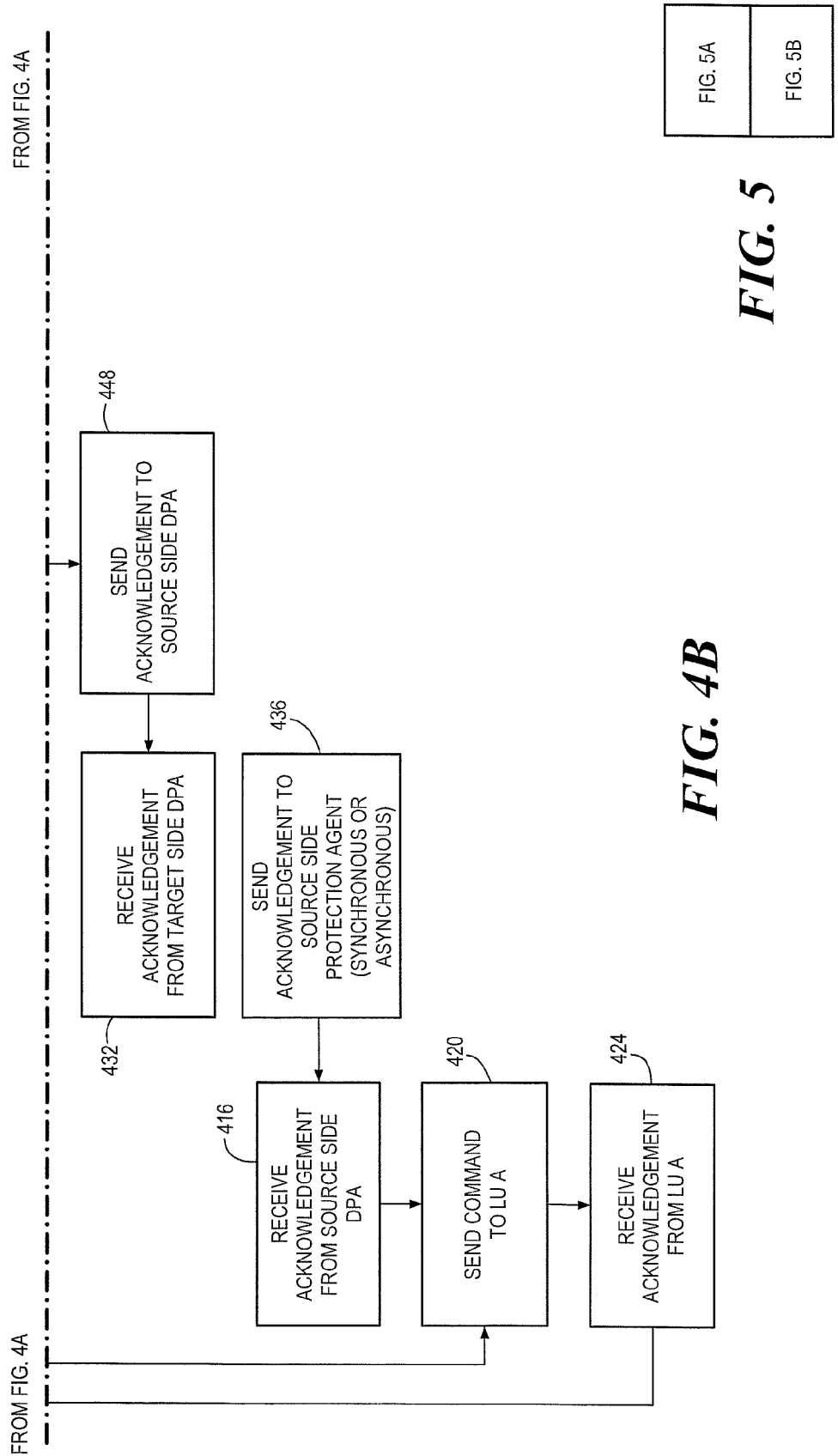

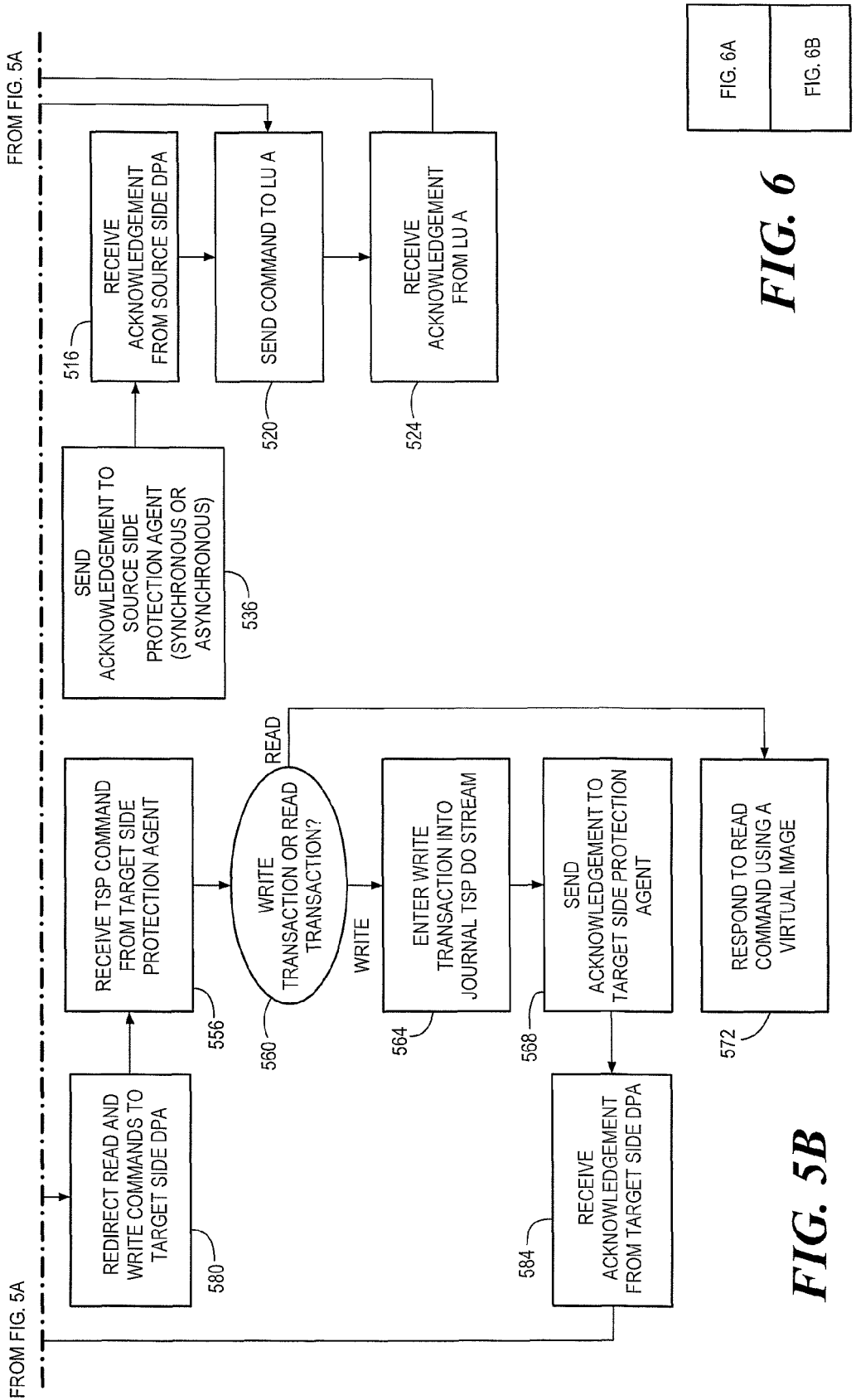

METHODS AND APPARATUS FOR BOTTLENECK PROCESSING IN A CONTINUOUS DATA PROTECTION SYSTEM HAVING JOURNALING

BACKGROUND

Computer data is vital to today's organizations, and a significant part of protection against disasters is focused on data protection. As solid-state memory has advanced to the point where cost of memory has become a relatively insignificant factor, organizations can afford to operate with systems that store and process terabytes of data.

Conventional data protection systems include tape backup drives, for storing organizational production site data on a periodic basis. Such systems suffer from several drawbacks. First, they require a system shutdown during backup, since the data being backed up cannot be used during the backup operation. Second, they limit the points in time to which the production site can recover. For example, if data is backed up on a daily basis, there may be several hours of lost data in the event of a disaster. Third, the data recovery process itself takes a long time.

Another conventional data protection system uses data replication, by creating a copy of the organization's production site data on a secondary backup storage system, and updating the backup with changes. The backup storage system may be situated in the same physical location as the production storage system, or in a physically remote location. Data replication systems generally operate either at the application level, at the file system level, or at the data block level.

Current data protection systems try to provide continuous data protection, which enable the organization to roll back to any specified point in time within a recent history. Continuous data protection systems aim to satisfy two conflicting objectives, as best as possible; namely, (i) minimize the down time, in which the organization production site data is unavailable, during a recovery, and (ii) enable recovery as close as possible to any specified point in time within a recent history.

Continuous data protection typically uses a technology referred to as "journaling," whereby a log is kept of changes made to the backup storage. During a recovery, the journal entries serve as successive "undo" information, enabling roll-back of the backup storage to previous points in time. Journaling was first implemented in database systems, and was later extended to broader data protection.

One challenge to continuous data protection is the ability of a backup site to keep pace with the data transactions of a production site, without slowing down the production site. The overhead of journaling inherently requires several data transactions at the backup site for each data transaction at the production site. As such, when data transactions occur at a high rate at the production site, the backup site may not be able to finish backing up one data transaction before the next production site data transaction occurs. If the production site is not forced to slow down, then necessarily a backlog of un-logged data transactions may build up at the backup site. Without being able to satisfactorily adapt dynamically to changing data transaction rates, a continuous data protection system chokes and eventually forces the production site to shut down.

SUMMARY

In one aspect of the invention, a method comprises detecting bottlenecks in a continuous data protection system having journal data structures including a do stream and an undo stream, where the do stream contains received read/write data not yet distributed to a journal volume and the undo stream contains read/write data in the journal volume prior to data from the do stream, collecting information for time for data in the do stream to be written to the journal volume, generating a first bottleneck exception if the collected time for data in the do stream to be written to the journal volume is greater than a phase one threshold value, collecting information for time for data to be read from the do stream, and generating a second bottleneck exception if the collected time for data in the do stream to be read is greater than a phase two threshold value.

In another aspect of the invention, a computer readable medium contains instructions to enable a machine to perform: detecting bottlenecks in a continuous data protection system having journal data structures including a do stream and an undo stream, where the do stream contains received read/write data not yet distributed to a journal volume and the undo stream contains read/write data in the journal volume prior to data from the do stream, collecting information for time for data in the do stream to be written to the journal volume, generating a first bottleneck exception if the collected time for data in the do stream to be written to the journal volume is greater than a phase one threshold value, collecting information for time for data to be read from the do stream, and generating a second bottleneck exception if the collected time for data in the do stream to be read is greater than a phase two threshold value.

In a further aspect of the invention, a continuous data protection system having journal data structures including a do stream and an undo stream comprises a bottleneck module to detect bottlenecks, where the do stream contains received read/write data not yet distributed to a journal volume and the undo stream contains read/write data in the journal volume prior to data from the do stream, collect information for time for data in the do stream to be written to the journal volume, generate a first bottleneck exception if the collected time for data in the do stream to be written to the journal volume is greater than a phase one threshold value, collect information for time for data to be read from the do stream, and generate a second bottleneck exception if the collected time for data in the do stream to be read is greater than a phase two threshold value.

BRIEF DESCRIPTION OF THE DRAWINGS

The present invention will be more fully understood and appreciated from the following detailed description, taken in conjunction with the drawings in which:

FIG. 4 is a simplified flowchart of a data protection method during a normal production mode, in accordance with an embodiment of the present invention;

DETAILED DESCRIPTION

The following definitions are employed throughout the specification and claims.

BACKUP SITE—a facility where replicated production site data is stored; the backup site may be located in a remote site or at the same location as the production site;

DPA—a computer or a cluster of computers that serve as a data protection appliance, responsible for data protection services including inter alia data replication of a storage system, and journaling of I/O requests issued by a host computer to the storage system;

HOST—at least one computer or networks of computers that runs at least one data processing application that issues I/O requests to one or more storage systems; a host is an initiator with a SAN;

HOST DEVICE—an internal interface in a host, to a logical storage unit;

IMAGE—a copy of a logical storage unit at a specific point in time;

INITIATOR—a node in a SAN that issues I/O requests;

JOURNAL—a record of write transactions issued to a storage system; used to maintain a duplicate storage system, and to rollback the duplicate storage system to a previous point in time;

LOGICAL UNIT—a logical entity provided by a storage system for accessing data from the storage system;

LUN—a logical unit number for identifying a logical unit;

PHYSICAL STORAGE UNIT—a physical entity, such as a disk or an array of disks, for storing data in storage locations that can be accessed by address;

PRODUCTION SITE—a facility where one or more host computers run data processing applications that write data to a storage system and read data from the storage system;

SAN—a storage area network of nodes that send and receive I/O and other requests, each node in the network being an initiator or a target, or both an initiator and a target;

SOURCE SIDE—a transmitter of data within a data replication workflow, during normal operation a production site is the source side; and during data recovery a backup site is the source side;

STORAGE SYSTEM—a SAN entity that provides multiple logical units for access by multiple SAN initiators TARGET—a node in a SAN that replies to I/O requests;

TARGET SIDE—a receiver of data within a data replication workflow; during normal operation a back site is the target side, and during data recovery a production site is the target side;

WAN—a wide area network that connects local networks and enables them to communicate with one another, such as the Internet.

Figure 1:
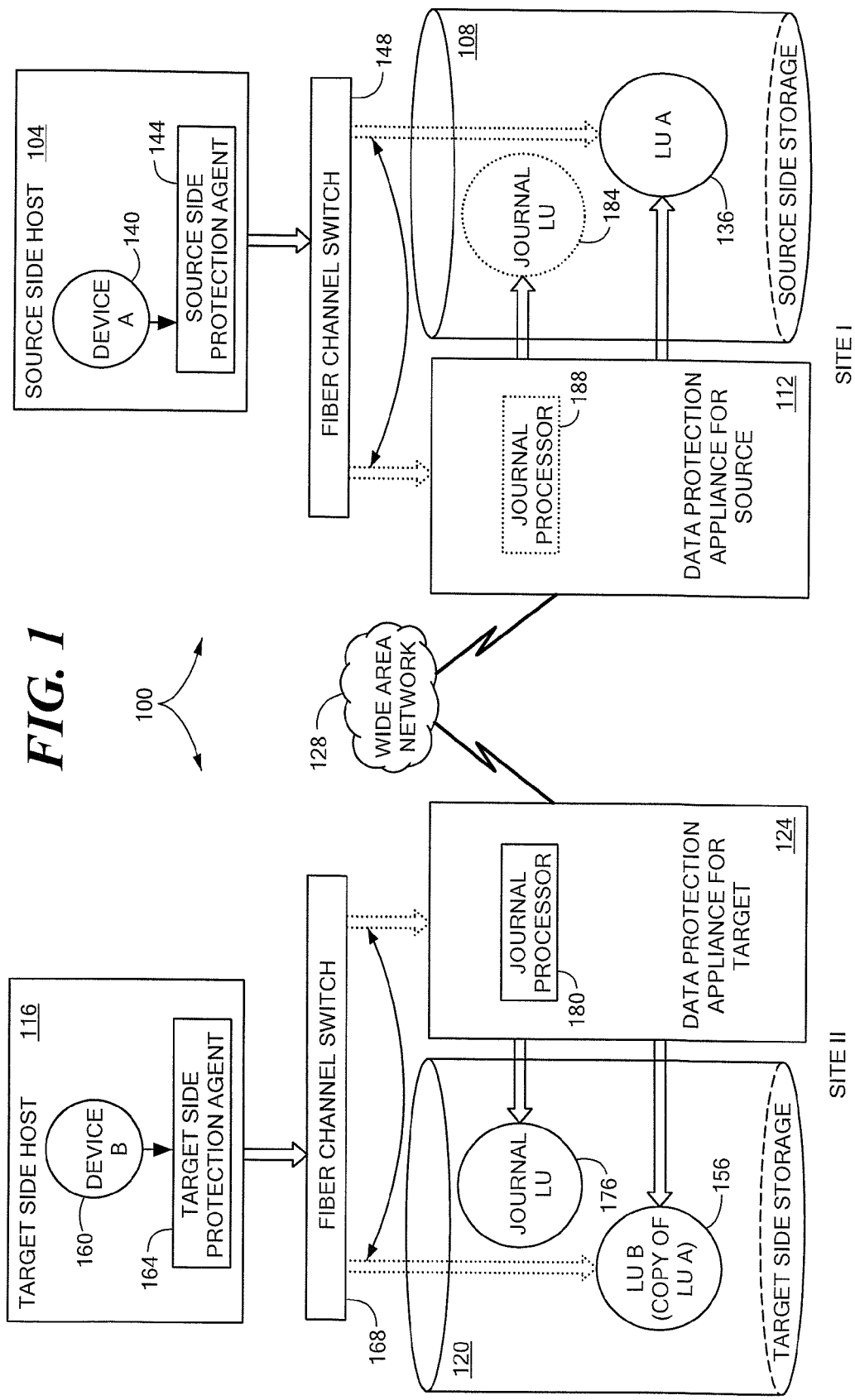
FIG. 1 is a simplified block diagram of a data protection system, in accordance with an embodiment of the present invention.

Reference is now made to FIG. 1, which is a simplified illustration of a data protection system 100, in accordance with an embodiment of the present invention. Shown in FIG. 1 are two sites; Site I, which is a production site, on the right, and Site II which is a backup site, on the left. Under normal operation the production site is the source side of system 100, and the backup site is the target side of the system. The backup site is responsible for replicating production site data. Additionally, the backup site enables rollback of Site I data to an earlier pointing time, which may be used in the event of data corruption of a disaster, or alternatively in order to view or to access data from an earlier point in time.

During normal operations, the direction of replicate data flow goes from source side to target side. It is possible, however, for a user to reverse the direction of replicate data flow, in which case Site I starts to behave as a target backup site, and Site II starts to behave as a source production site. Such change of replication direction is referred to as a "failover". A failover may be performed in the event of a disaster at the production site, or for other reasons. In some data architectures, Site I or Site II behaves as a production site for a portion of stored data, and behaves simultaneously as a backup site for another portion of stored data. In some data architectures, a portion of stored data is replicated to a backup site, and another portion is not.

The production site and the backup site may be remote from one another, or they may both be situated at a common site, local to one another. Local data protection has the advantage of minimizing data lag between target and source, and remote data protection has the advantage is being robust in the event that a disaster occurs at the source side.

The source and target sides communicate via a wide area network (WAN) 128, although other types of networks are also adaptable for use with the present invention.

In accordance with an embodiment of the present invention, each side of system 100 includes three major components coupled via a storage area network (SAN); namely, (i)

a storage system, (ii) a host computer, and (iii) a data protection appliance (DPA). Specifically with reference to FIG. 1, the source side SAN includes a source host computer 104, a source storage system 108, and a source DPA 112. Similarly, the target side SAN includes a target host computer 116, a target storage system 120, and a target DPA 124.

Generally, a SAN includes one or more devices, referred to as "nodes". A node in a SAN may be an "initiator" or a "target", or both. An initiator node is a device that is able to initiate requests to one or more other devices; and a target node is a device that is able to reply to requests, such as SCSI commands, sent by an initiator node. A SAN may also include network switches, such as fiber channel switches. The communication links between each host computer and its corresponding storage system may be any appropriate medium suitable for data transfer, such as fiber communication channel links.

In an embodiment of the present invention, the host communicates with its corresponding storage system using small computer system interface (SCSI) commands.

System 100 includes source storage system 108 and target storage system 120. Each storage system includes physical storage units for storing data, such as disks or arrays of disks. Typically, storage systems 108 and 120 are target nodes. In order to enable initiators to send requests to storage system 108, storage system 108 exposes one or more logical units (LU) to which commands are issued. Thus, storage systems 108 and 120 are SAN entities that provide multiple logical units for access by multiple SAN initiators.

Logical units are a logical entity provided by a storage system, for accessing data stored in the storage system. A logical unit is identified by a unique logical unit number (LUN). In an embodiment of the present invention, storage system 108 exposes a logical unit 136, designated as LU A, and storage system 120 exposes a logical unit 156, designated as LU B.

In an embodiment of the present invention, LU B is used for replicating LU A. As such, LU B is generated as a copy of LU A. In one embodiment, LU B is configured so that its size is identical to the size of LU A. Thus for LU A, storage system 120 serves as a backup for source side storage system 108. Alternatively, as mentioned hereinabove, some logical units of storage system 120 may be used to back up logical units of storage system 108, and other logical units of storage system 120 may be used for other purposes. Moreover, in certain embodiments of the present invention, there is symmetric replication whereby some logical units of storage system 108 are used for replicating logical units of storage system 120, and other logical units of storage system 120 are used for replicating other logical units of storage system 108.

System 100 includes a source side host computer 104 and a target side host computer 116. A host computer may be one computer, or a plurality of computers, or a network of distributed computers, each computer may include inter alia a conventional CPU, volatile and non-volatile memory, a data bus, an I/O interface, a display interface and a network interface. Generally a host computer runs at least one data processing application, such as a database application and an e-mail server.

Generally, an operating system of a host computer creates a host device for each logical unit exposed by a storage system in the host computer SAN. A host device is a logical entity in a host computer, through which a host computer may access a logical unit. In an embodiment of the present invention, host device 104 identifies LU A and generates a corresponding host device 140, designated as Device A, through which it can access LU A. Similarly, host computer 116 identifies LU B and generates a corresponding device 160, designated as Device B.

In an embodiment of the present invention, in the course of continuous operation, host computer 104 is a SAN initiator that issues I/O requests (write/read operations) through host device 140 to LU A using, for example, SCSI commands. Such requests are generally transmitted to LU A with an address that includes a specific device identifier, an offset within the device, and a data size. Offsets are generally aligned to 512 byte blocks. The average size of a write operation issued by host computer 104 may be, for example, 10 kilobytes (KB); i.e., 20 blocks. For an I/O rate of 50 megabytes (MB) per second, this corresponds to approximately 5,000 write transactions per second.

System 100 includes two data protection appliances, a source side DPA 112 and a target side DPA 124. A DPA performs various data protection services, such as data replication of a storage system, and journaling of I/O requests issued by a host computer to source side storage system data. As explained in detail hereinbelow, when acting as a target side DPA, a DPA may also enable rollback of data to an earlier point in time, and processing of rolled back data at the target site. Each DPA 112 and 124 is a computer that includes inter alia one or more conventional CPUs and internal memory.

For additional safety precaution, each DPA is a cluster of such computers. Use of a cluster ensures that if a DPA computer is down, then the DPA functionality switches over to another computer. The DPA computers within a DPA cluster communicate with one another using at least one communication link suitable for data transfer via fiber channel or IP based protocols, or such other transfer protocol. One computer from the DPA cluster serves as the DPA leader. The DPA cluster leader coordinates between the computers in the cluster, and may also perform other tasks that require coordination between the computers, such as load balancing.

In the architecture illustrated in FIG. 1, DPA 112 and DPA 124 are standalone devices integrated within a SAN. Alternatively, each of DPA 112 and DPA 124 may be integrated into storage system 108 and storage system 120, respectively, or integrated into host computer 104 and host computer 116, respectively. Both DPAs communicate with their respective host computers through communication lines such as fiber channels using, for example, SCSI commands.

In accordance with an embodiment of the present invention, DPAs 112 and 124 are configured to act as initiators in the SAN; i.e., they can issue I/O requests using, for example, SCSI commands, to access logical units on their respective storage systems. DPA 112 and DPA 124 are also configured with the necessary functionality to act as targets; i.e., to reply to I/O requests, such as SCSI commands, issued by other initiators in the SAN, including inter alia their respective host computers 104 and 116. Being target nodes, DPA 112 and DPA 124 may dynamically expose or remove one or more logical units.

As described hereinabove, Site I and Site II may each behave simultaneously as a production site and a backup site for different logical units. As such, DPA 112 and DPA 124 may each behave as a source DPA for some logical units, and as a target DPA for other logical units, at the same time.

In accordance with an embodiment of the present invention, host computer 104 and host computer 116 include protection agents 144 and 164, respectively. Protection agents 144 and 164 intercept SCSI commands issued by their respective host computers, via host devices to logical units that are accessible to the host computers. In accordance with an embodiment of the present invention, a data protection agent may act on an intercepted SCSI commands issued to a logical unit, in one of the following ways:

Send the SCSI commands to its intended logical unit.

Redirect the SCSI command to another logical unit.

Split the SCSI command by sending it first to the respective DPA. After the DPA returns an acknowledgement, send the SCSI command to its intended logical unit.

Fail a SCSI command by returning an error return code.

Delay a SCSI command by not returning an acknowledgement to the respective host computer.

A protection agent may handle different SCSI commands, differently, according to the type of the command. For example, a SCSI command inquiring about the size of a certain logical unit may be sent directly to that logical unit, while a SCSI write command may be split and sent first to a DPA associated with the agent. A protection agent may also change its behavior for handling SCSI commands, for example as a result of an instruction received from the DPA.

Specifically, the behavior of a protection agent for a certain host device generally corresponds to the behavior of its associated DPA with respect to the logical unit of the host device. When a DPA behaves as a source site DPA for a certain logical unit, then during normal course of operation, the associated protection agent splits I/O requests issued by a host computer to the host device corresponding to that logical unit. Similarly, when a DPA behaves as a target device for a certain logical unit, then during normal course of operation, the associated protection agent fails I/O requests issued by host computer to the host device corresponding to that logical unit.

Communication between protection agents and their respective DPAs may use any protocol suitable for data transfer within a SAN, such as fiber channel, or SCSI over fiber channel. The communication may be direct, or via a logical unit exposed by the DPA. In an embodiment of the present invention, protection agents communicate with their respective DPAs by sending SCSI commands over fiber channel.

In an embodiment of the present invention, protection agents 144 and 164 are drivers located in their respective host computers 104 and 116. Alternatively, a protection agent may also be located in a fiber channel switch, or in any other device situated in a data path between a host computer and a storage system.

What follows is a detailed description of system behavior under normal production mode, and under recovery mode.

In accordance with an embodiment of the present invention, in production mode DPA 112 acts as a source site DPA for LU A. Thus, protection agent 144 is configured to act as a source side protection agent; i.e., as a splitter for host device A. Specifically, protection agent 144 replicates SCSI I/O requests. A replicated SCSI I/O request is sent to DPA 112. After receiving an acknowledgement from DPA 124, protection agent 144 then sends the SCSI I/O request to LU A. Only after receiving a second acknowledgement from storage system 108 will host computer 104 initiate another I/O request.

When DPA 112 receives a replicated SCSI write request from data protection agent 144, DPA 112 transmits certain I/O information characterizing the write request, packaged as a "write transaction", over WAN 128 to DPA 124 on the target side, for journaling and for incorporation within target storage system 120.

DPA 112 may send its write transactions to DPA 124 using a variety of modes of transmission, including inter alia (i) a synchronous mode, (ii) an asynchronous mode, and (iii) a snapshot mode. In synchronous mode, DPA 112 sends each write transaction to DPA 124, receives back an acknowledgement from DPA 124, and in turns sends an acknowledgement back to protection agent 144. Protection agent 144 waits until receipt of such acknowledgement before sending the SCSI write request to LU A.

In asynchronous mode, DPA 112 sends an acknowledgement to protection agent 144 upon receipt of each I/O request, before receiving an acknowledgement back from DPA 124.

In snapshot mode, DPA 112 receives several I/O requests and combines them into an aggregate "snapshot" of all write activity performed in the multiple I/O requests, and sends the snapshot to DPA 124, for journaling and for incorporation in target storage system 120. In snapshot mode DPA 112 also sends an acknowledgement to protection agent 144 upon receipt of each I/O request, before receiving an acknowledgement back from DPA 124.

For the sake of clarity, the ensuing discussion assumes that information is transmitted at write-by-write granularity.

While in production mode, DPA 124 receives replicated data of LU A from DPA 112, and performs journaling and writing to storage system 120. When applying write operations to storage system 120, DPA 124 acts as an initiator, and sends SCSI commands to LU B.

During a recovery mode, DPA 124 undoes the write transactions in the journal, so as to restore storage system 120 to the state it was at, at an earlier time.

As described hereinabove, in accordance with an embodiment of the present invention, LU B is used as a backup of LU A. As such, during normal production mode, while data written to LU A by host computer 104 is replicated from LU A to LU B, host computer 116 should not be sending I/O requests to LU B. To prevent such I/O requests from being sent, protection agent 164 acts as a target site protection agent for host Device B and fails I/O requests sent from host computer 116 to LU B through host Device B.

In accordance with an embodiment of the present invention, target storage system 120 exposes a logical unit 176, referred to as a "journal LU", for maintaining a history of write transactions made to LU B, referred to as a "journal". Alternatively, journal LU 176 may be striped over several logical units, or may reside within all of or a portion of another logical unit. DPA 124 includes a journal processor 180 for managing the journal.

Journal processor 180 functions generally to manage the journal entries of LU B. Specifically, journal processor 180 (i) enters write transactions received by DPA 124 from DPA 112 into the journal, by writing them into the journal LU, (ii) applies the journal transactions to LU B. and (iii) updates the journal entries in the journal LU with undo information and removes already-applied transactions from the journal. As described below, with reference to FIGS. 2 and 3A-3D, journal entries include four streams, two of which are written when write transaction are entered into the journal, and two of which are written when write transaction are applied and removed from the journal.

Figure 2:
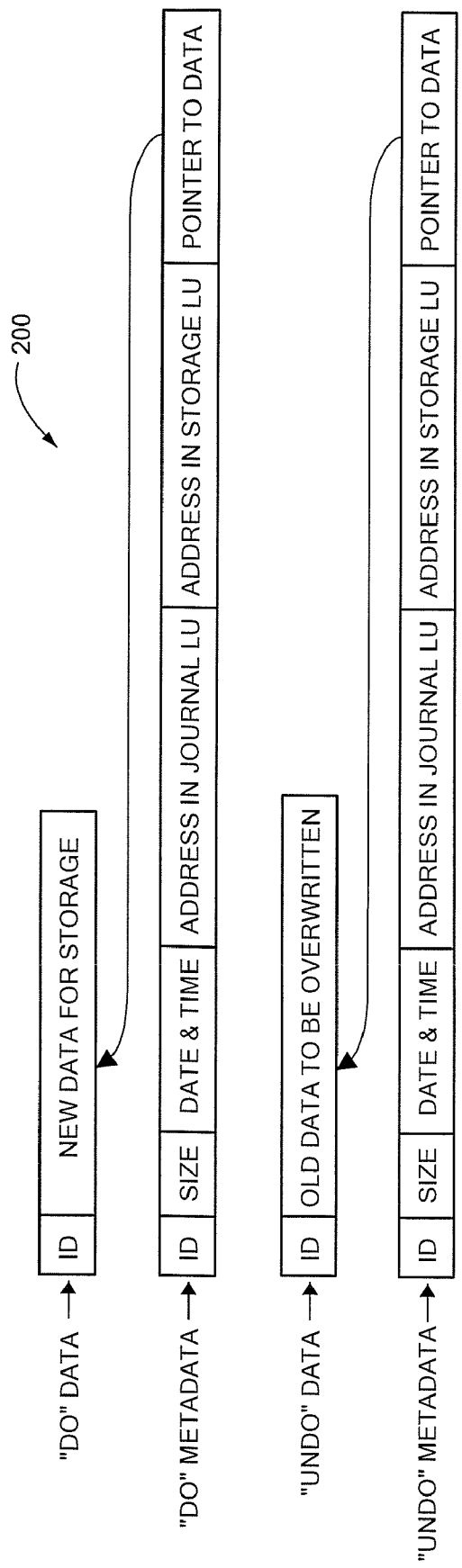
FIG. 2 is a simplified illustration of a journal history of write transactions for a storage system, in accordance with an embodiment of the present invention.

Reference is now made to FIG. 2, which is a simplified illustration of a write transaction 200 for a journal, in accordance with an embodiment of the present invention. The journal may be used to provide an adaptor for access to storage 120 at the state it was in at any specified point in time. Since the journal contains the "undo" information necessary to rollback storage system 120, data that was stored in specific memory locations at the specified point in time may be obtained by undoing write transactions that occurred subsequent to such point in time.

Write transaction 200 generally includes the following fields:
 one or more identifiers;
 a time stamp, which is the date & time at which the transaction was received by source side DPA 112;
 a write size, which is the size of the data block;
 a location in journal LU 176 where the data is entered;
 a location in LU B where the data is to be written; and
 the data itself.

Write transaction 200 is transmitted from source side DPA 112 to target side DPA 124. As shown in FIG. 2, DPA 124 records the write transaction 200 in four streams. A first stream, referred to as a DO stream, includes new data for writing in LU B. A second stream, referred to as an DO METADATA stream, includes metadata for the write transaction, such as an identifier, a date & time, a write size, a beginning address in LU B for writing the new data in, and a pointer to the offset in the do stream where the corresponding data is located. Similarly, a third stream, referred to as an UNDO stream, includes old data that was overwritten in LU B; and a fourth stream, referred to as an UNDO METADATA, include an identifier, a date & time, a write size, a beginning address in LU B where data was to be overwritten, and a pointer to the offset in the undo stream where the corresponding old data is located.

In practice each of the four streams holds a plurality of write transaction data. As write transactions are received dynamically by target DPA 124, they are recorded at the end of the DO stream and the end of the DO METADATA stream, prior to committing the transaction. During transaction application, when the various write transactions are applied to LU B, prior to writing the new DO data into addresses within the storage system, the older data currently located in such addresses is recorded into the UNDO stream.

By recording old data, a journal entry can be used to "undo" a write transaction. To undo a transaction, old data is read from the UNDO stream in a reverse order, from the most recent data to the oldest data, for writing into addresses within LU B. Prior to writing the UNDO data into these addresses, the newer data residing in such addresses is recorded in the DO stream.

The journal LU is partitioned into segments with a predefined size, such as 1 MB segments, with each segment identified by a counter. The collection of such segments forms a segment pool for the four journaling streams described hereinabove. Each such stream is structured as an ordered list of segments, into which the stream data is written, and includes two pointers—a beginning pointer that points to the first segment in the list and an end pointer that points to the last segment in the list.

According to a write direction for each stream, write transaction data is appended to the stream either at the end, for a forward direction, or at the beginning, for a backward direction. As each write transaction is received by DPA 124, its size is checked to determine if it can fit within available segments. If not, then one or more segments are chosen from the segment pool and appended to the stream's ordered list of segments.

Thereafter the DO data is written into the DO stream, and the pointer to the appropriate first or last segment is updated. Freeing of segments in the ordered list is performed by simply changing the beginning or the end pointer. Freed segments are returned to the segment pool for re-use.

When a write transaction is received, journaling is thus advanced as indicated in TABLE I below.

TABLE I

Entering a write transaction in the journal

| | |
|---|---|
| Step 1 | The new data is written at the end of the DO stream, assuming a forward write direction, and corresponding metadata is written at the end of the DO METADATA stream. |
| Step 2 | Data is read from the beginning of the DO stream, and corresponding metadata is read from the beginning of the DO METADATA stream. |
| Step 3 | Old data to be overwritten is read from LU B. The location and size of such old data is determined from the DO METADATA stream. |
| Step 4 | The old data is written at the end of the UNDO stream, and corresponding metadata is written at the end of the UNDO METADATA stream. |
| Step 5 | The new data read at Step 2 is written into LU B, and the beginning and end pointers of the DO and DO METADATA streams are moved appropriately. |

Conversely, during a rollback to undo a write transaction, the above operations are reversed, as indicated in TABLE II below.

TABLE II

Undoing a write transaction in the journal

| | |
|---|---|
| Step 1 | Read the data and metadata from the end of the UNDO and UNDO METADATA streams. |
| Step 2 | Read from LU B the data that is to be overwritten. The location and size of such data is determined from the UNDO METADATA stream. |
| Step 3 | Write the data from Step 2 at the beginning of the DO stream, and update the DO METADATA stream accordingly. |
| Step 4 | Write the data from Step 1 to LU B, and update the beginning and end pointers of the UNDO and UNDO metadata streams appropriately. |

The following example, in conjunction with FIGS. 3A-3D, describes specific details of the journaling process, in accordance with an embodiment of the present invention. A journal volume includes a plurality of segments from a segment pool, each segment including 20 data blocks.

Three write transactions are received, as indicated in TABLE III.

TABLE III

Example Write Transactions

| Write ID | Time | LU B location | Length | Journal LU location |
|---|---|---|---|---|
| 1 | 12/03/05 10:00:00.00 | LU B offset 57 blocks | 15 blocks | Segment 1, offset 0 |
| 2 | 12/03/05 10:00:00.05 | LU B offset 87 blocks | 20 blocks | Segment 1, offset 15 |
| 3 | 12/03/05 10:00:00.18 | LU B offset 12 blocks | 20 blocks | Segment 3, Offset 15 |

The following discussion describes four stages of journaling and data storage; namely, Stage #1: Enter the three write transactions as journal entries in the journal LU.
Stage #2: Apply the first write transaction to LU B.
Stage #3: Apply the second write transaction to LU B.
Stage #4: Rollback the second write transaction, to recover data from an earlier point in time.

The write transaction with ID=1 is written to the first 15 blocks of Segment #1. The metadata corresponding to this transaction is written to the first block of Segment #2. The second write transaction with ID=2 is written to the last 5 blocks of Segment #1 and the first 15 blocks of Segment #3. The metadata corresponding to this transaction is written to the second block of Segment #2. The third write transaction with ID=3 is written to the last 5 blocks of Segment #3 and the first 15 blocks of Segment #4. The metadata corresponding to this transaction is written to the third block of Segment #2.

Figure 3A:
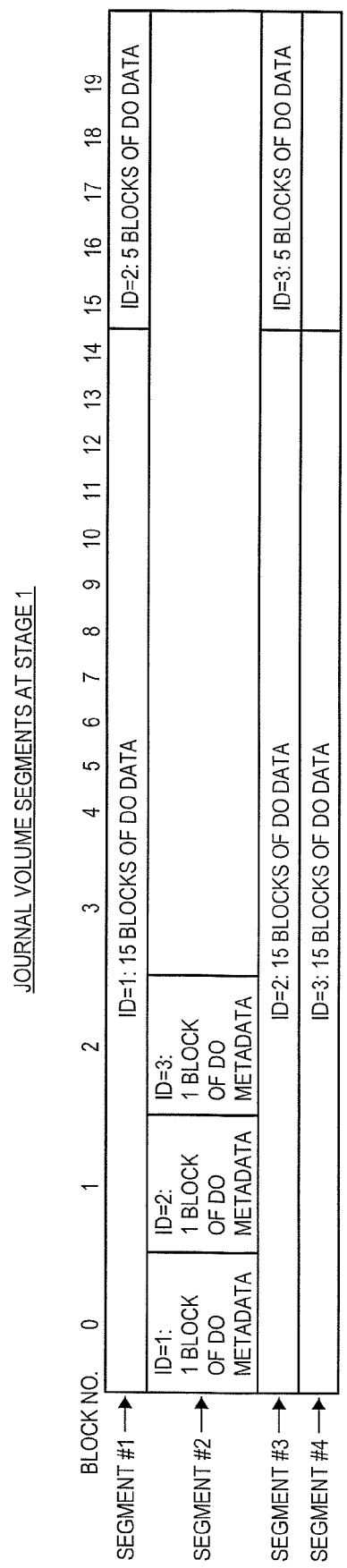
FIG. 3A is a simplified illustration of a first stage of a journal and four data streams stored therein, after recording three write transactions, in accordance with an embodiment of the present invention.

Thus at stage #1, the DO stream in memory includes a list of segments 1, 3, 4; and a beginning pointer to offset=0 in Segment #1 and an end pointer to offset=10 in Segment #4. The DO METADATA stream in memory includes a list of one segment, namely Segment #2; and a beginning pointer to offset=0 in Segment #2 and an end pointer to offset=3 in Segment #2. The UNDO stream and the UNDO METADATA stream are empty. The journal and the four streams at the end of stage #1 are illustrated in FIG. 3A.

At stage #2 the write transaction with ID=1 is applied to LU B. New data to be written is read from the journal LU at the offset and length indicated in the DO METADATA; namely, 15 blocks of data located in blocks 0-14 of journal volume Segment #1. Correspondingly, old data is read from LU B at the offset and length indicated in the UNDO METADATA; namely, 15 blocks of data located in blocks 57-71 of LU B. The old data is then written into the UNDO stream in the journal LU, and the associated metadata is written into the UNDO METADATA stream in the journal LU. Specifically, for this example, the UNDO data is written into the first 15 blocks of Segment #5, and the UNDO METADATA is written into the first block of Segment #6. The beginning pointer of the UNDO data stream is set to offset=0 in Segment #5, and the end pointer is set to offset=15 in Segment #5. Similarly, the beginning pointer of the UNDO METADATA stream is set to offset=0 on Segment #6, and the end pointer is set to offset=1 in Segment #6.

Figure 3B:
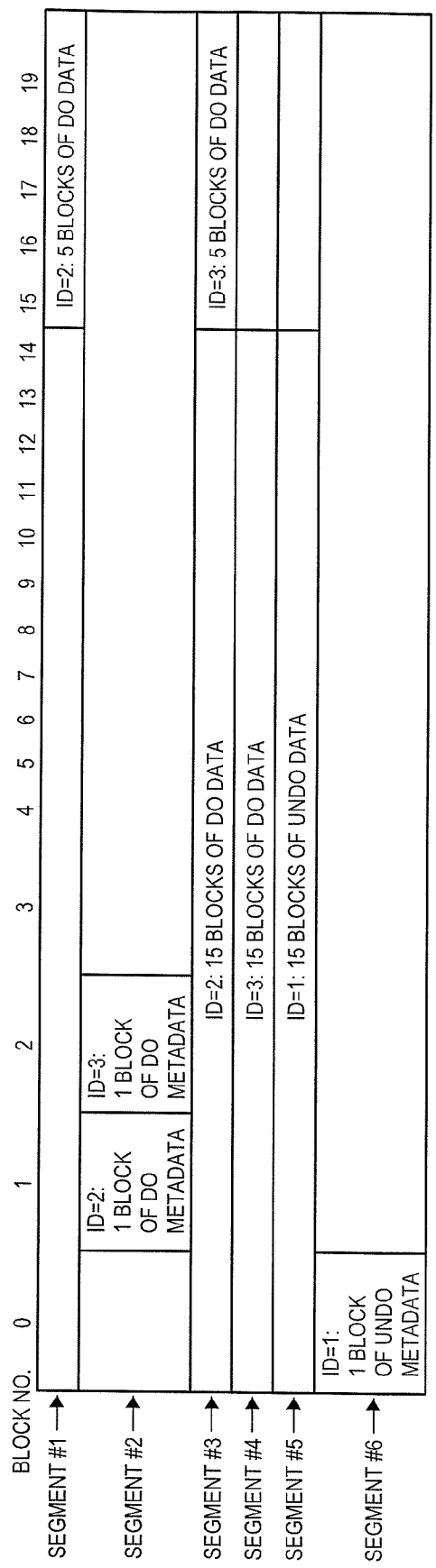
FIG. 3B is a simplified illustration of a second stage of a journal and four data streams stored therein, after applying a first write transactions to a storage system, in accordance with an embodiment of the present invention.

At this point, the new data that was read from blocks 0-14 of journal LU Segment #1 is written to blocks 57-71 of LU B. The beginning pointer for the DO stream is moved forward to block 15 of journal LU Segment #1, and the beginning pointer for the DO METADATA stream is moved forward to block 1 of journal LU Segment #2. The journal and the four streams at the end of stage #2 are illustrated in FIG. 3B.

At stage #3 the write transaction with ID=2 is applied to the storage system. As above, 20 blocks of new data are read from blocks 15-19 of journal LU Segment #1 and from blocks 0-14 of journal LU Segment #3. Similarly, 20 blocks of old data are read from blocks 87-106 of LU B. The old data is written to the UNDO stream in the last 5 blocks of journal LU Segment #5 and the first 15 blocks of journal LU Segment #7. The associated metadata is written to the UNDO METADATA stream in the second block of Segment #6. The list of segments in the UNDO stream includes Segment #5 and Segment #7. The end pointer of the UNDO stream is moved to block 15 of Segment #7, and the end pointed of the UNDO METADATA stream is moved to block 2 of Segment #6.

Figure 3C:
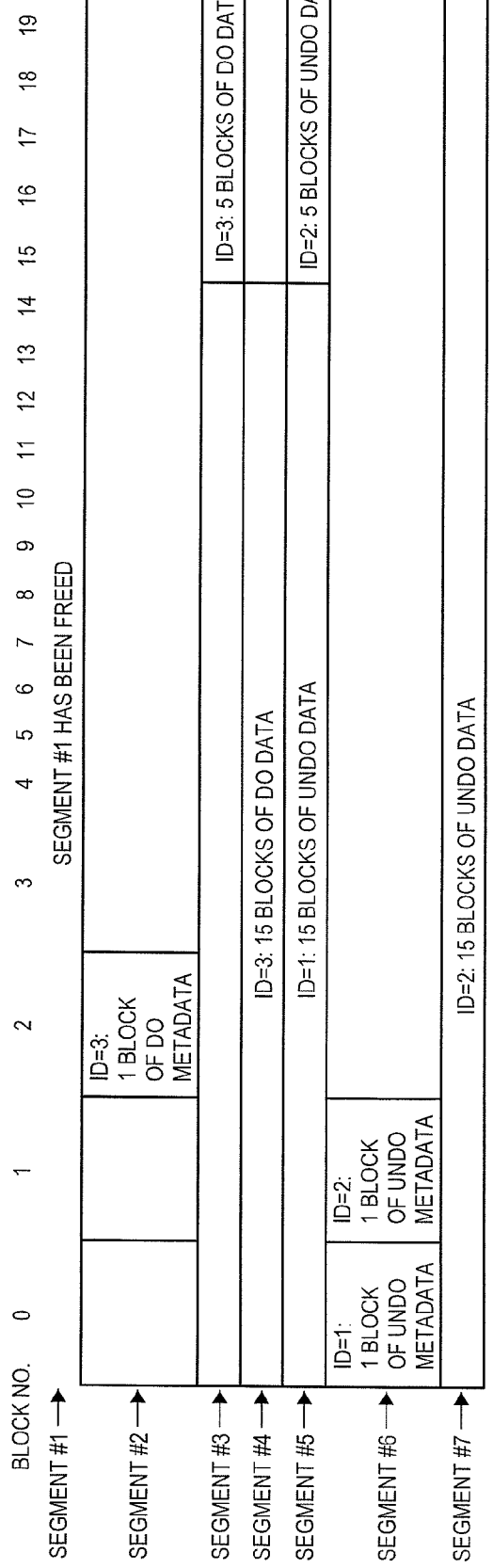
FIG. 3C is a simplified illustration of a third stage of a journal history and four data streams stored therein, after applying a second write transactions to a storage system, in accordance with an embodiment of the present invention.

Finally, the new data from blocks 15-19 of journal LU Segment #1 and blocks 0-14 of journal LU Segment #3 is written into blocks 87-106 of LU B. The beginning pointer for the DO stream is moved forward to block 15 of journal volume Segment #3, and the beginning pointer for the DO METADATA stream is moved forward to block 2 of journal LU Segment #2. Segment #1 is freed from the DO stream, for recycling within the segment pool, and the list of segments for the DO stream is changed to Segment #3 and Segment #4. The journal and the four streams at the end of stage #3 are illustrated in FIG. 3C.

At stage #4 a rollback to time 10:00:00.00 is performed. Since the write transaction with ID=3 was not applied yet, the only write transaction to be undone is the write transaction with ID=2. The last entry is read from the UNDO METADATA stream, the location of the end of the UNDO METADATA stream being determined by its end pointer, i.e., the metadata before block 2 of journal LU Segment #6 is read, indicating two areas each of 20 blocks; namely, (a) the last 5 blocks of journal LU Segment #5 and the first 15 blocks of journal LU Segment #7, and (b) blocks 87-106 of LU B. Area (a) is part of the UNDO stream.

The 20 blocks of data from area (b) are read from LU B and written to the beginning of the DO stream. As the beginning pointer of the DO stream is set to offset=15 of journal LU Segment #3, 5 blocks are written at the end of Segment #3, and the remaining 15 blocks are written to Segment #8. The end pointer for the DO stream is set to block 15 of Segment #8. The list of segments for the DO stream is changed to Segment #3, Segment #4 and Segment #8. The metadata associated with the 20 blocks from area (b) is written to block 3 of Segment #2, and the end pointer of the DO METADATA stream is advanced to block 4 of Segment #2.

Figure 3D:
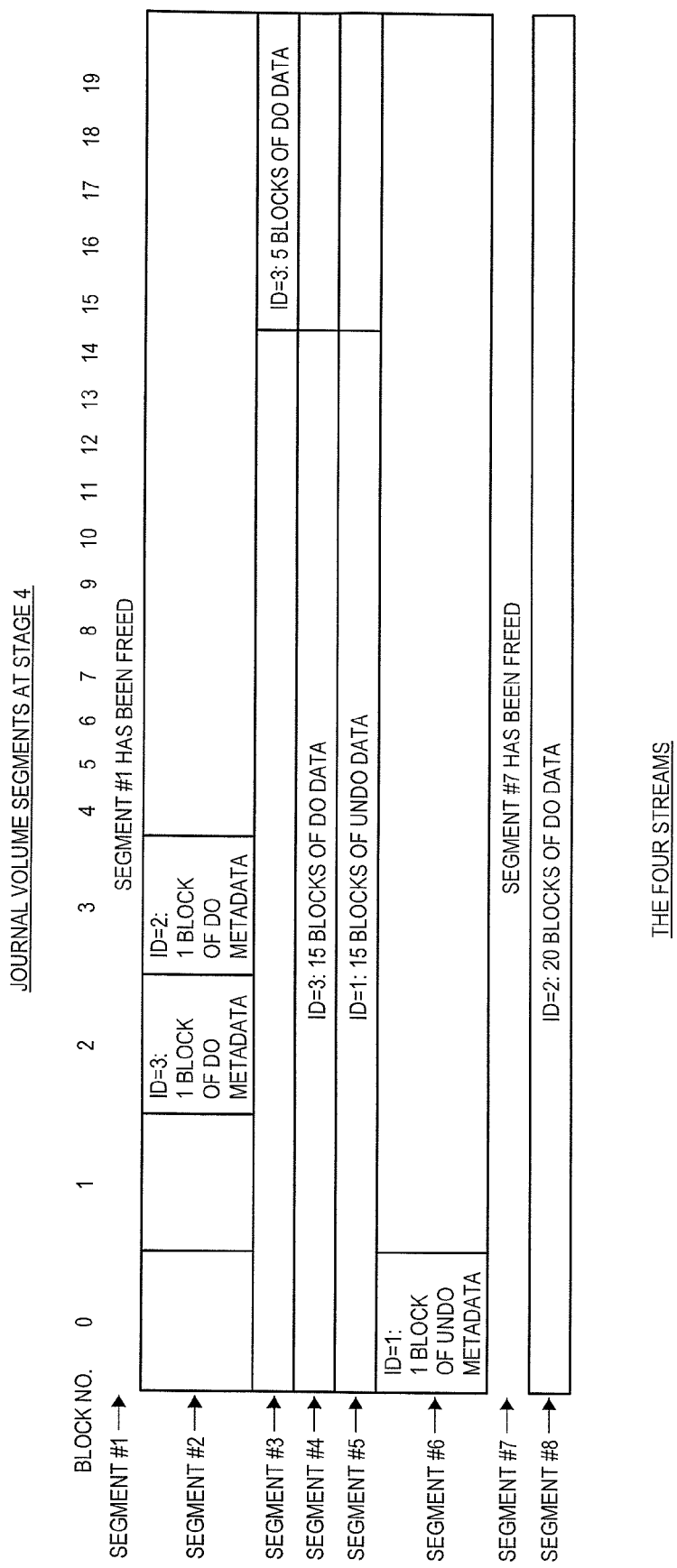
FIG. 3D is a simplified illustration of a fourth stage of a journal history and four data streams stored therein, after rolling back a write transaction, in accordance with an embodiment of the present invention.

The 20 blocks of data in area (a) of the journal LU are then written to area (b) of the LU B. Finally, Segment #7 is freed for recycling in the segment pool, the UNDO stream ending pointer is moved back to Segment #5 of the journal LU, block 15, and the UNDO METADATA stream ending pointed is moved back to Segment #6 of the journal LU, block 1. The journal and the four streams at the end of stage #4 are illustrated in FIG. 3D.

Thus it may be appreciated that the journal is thus used to rollback LU B to the state that it was in at a previous point in time. The journal is also used to selectively access data from LU B at such previous point in time, without necessarily performing a rollback. Selective access is useful for correcting one or more files that are currently corrupt, or for simply accessing old data.

TABLE IV below summarizes the behavior of the special protection components of system 100 during production mode. Reference is also made to FIG. 4, which is a simplified flowchart of a data protection method corresponding to TABLE IV.

FIG. 4 is divided into four columns. The leftmost column indicates steps performed by source side protection agent 112, the middle left column indicates steps performed by source side DPA 144, the middle right column indicates steps performed by target side DPA 124, and the rightmost column indicates steps performed by target side protection agent 164.

TABLE IV

| System Component | Behavior |
| --- | --- |
| Normal Production Mode Functionality | |
| Source Side Agent 144 | Intercept SCSI commands issued to LU A by source side host via Device A (step 404). Replicate write commands, and route write commands to DPA (steps 408 and 412). Wait for first acknowledgement, from DPA (step 416), and then route replicate I/O command to LU A (step 420). Wait for second acknowledgement, from storage system (step 424), and then process next intercepted SCSI command (step 404). |
| Source Side DPA 112 | Receive write command from agent (step 428). Format write command as write transaction, and send to target DPA (step 428). In synchronous mode, wait for acknowledgement from target DPA (step 432), and then send acknowledgement to agent (step 436). In asynchronous mode and in snapshot mode, send acknowledgement to agent without waiting for acknowledgement from target DPA (step 436). |

TABLE IV-continued

Normal Production Mode Functionality

| System Component | Behavior |
|---|---|
| Target Side DPA 142 | Receive write transaction from source DPA (step 444). Enter write transaction in journal DO and DO METADATA streams (step 444), and send back acknowledgement to source DPA (step 448). Process journal entries by applying them to LU B, and enter undo information in UNDO and UNDO METADATA streams (step 440). |
| Target Side Agent 164 | Fail SCSI commands issued to LU B (step 452). |

Only steps with arrows connecting them in FIG. 4 are necessarily sequential. Thus steps 432 and 436, which do not have arrows connecting them, are not necessarily sequential. In synchronous mode these steps are sequential, but in asynchronous mode and in snapshot mode they are not sequential. In particular, DPA 112 may send an acknowledgement to protection agent 144 before receiving an acknowledgement back from DPA 124.

It is also noted in FIG. 4 that the steps performed by target side DPA 124 include two non-sequential groups; namely, (i) step 440, and (ii) steps 444 and 448.

Recovery mode is generally triggered as a result of a disaster at the source side. The source side data may become corrupt, or may not exist at all. In such case, after recovery is completed at the backup site, a user may perform a failover operation by switching the roles of the production site and backup site. The original backup site becomes a current production site, and the original production site becomes a current backup site. Alternatively, recovery mode can be triggered without a failover, in order to access data from a previous point in time.

While in recovery mode, target site DPA 124 continues to receive new write transactions from DPA 112 and enter them at the ends of the DO and DO METADATA streams. However, unlike production mode behavior, DPA 124 stops applying journal entries received from DPA 112 to LU B. Instead, DPA 124 uses the UNDO stream of the journal to rollback LU B, as described hereinabove.

During recovery, after or possibly before rollback of LU B is complete, a user may wish to access data from the target site. To this end, protection agent 164 stops failing I/O requests issued by host computer 160 and begins redirecting them to DPA 124. The processing of data by host computer 160 during recovery mode is referred to as "target side processing (TSP)".

To manage TSP write commands that are received by target side DPA 124, journal processor 180 uses two additional data streams, referred to as TSP DO and TSP METADATA streams. When a TSP write command is received by DPA 124, it is entered at the end of the TSP DO stream and the end of the TSP DO METADATA stream. Since TSP writes relate to the state of LU B after the rollback is complete, the TSP DO stream writes are only applied to LU B after rollback is complete. Journal processor 180 applies TSP writes to LU B in a way similar to the way it applies write transactions deceiver from DPA 112; namely, journal processor 180 maintains the undo information for each write applied to LU B, in TSP UNDO and TSP UNDO METADATA streams.

When TSP read commands are received by target site DPA 124, DPA 124 returns the data to be read by identifying locations of the read command, and finding the most recent TSP write command or commands that were applied at these locations. The data is searched for (i) first in the TSP DO stream, and (ii) then in the journal UNDO data that was not yet applied to LU B and (iii) finally, if the data was not found in (i) and (ii), then the data is taken from LU B itself. In order to perform such a search efficiently, DPA 124 generates and stores in its memory a virtual image of the UNDO METADATA storage locations by using an efficient data structure, such as a binary search tree.

After rollback is completed, the TSP writes that were performed during the rollback are applied to LU B, and DPA 124 begins applying TSP writes synchronously; i.e., TSP writes are applied to LU B when they are received by DPA 124, without keeping them in the TSP DO stream. As such, when a read command is received after rollback is complete, it is sent directly to LU B instead of being redirected through DPA 124.

Figure 5A:
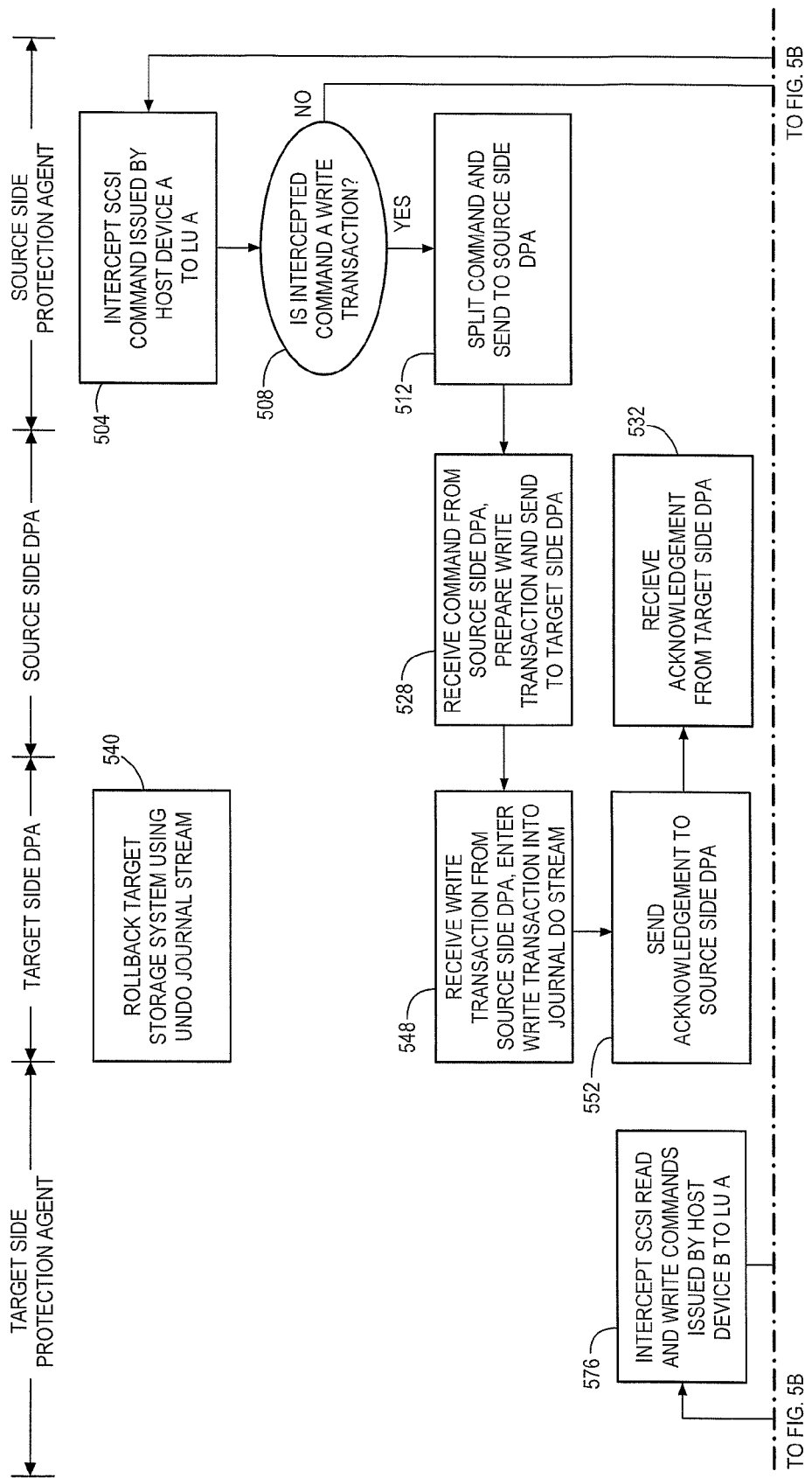
FIG. 5 is a simplified flowchart of a data protection method during a data recovery mode, prior to completion of rollback, in accordance with an embodiment of the present invention.
Figure 6A:
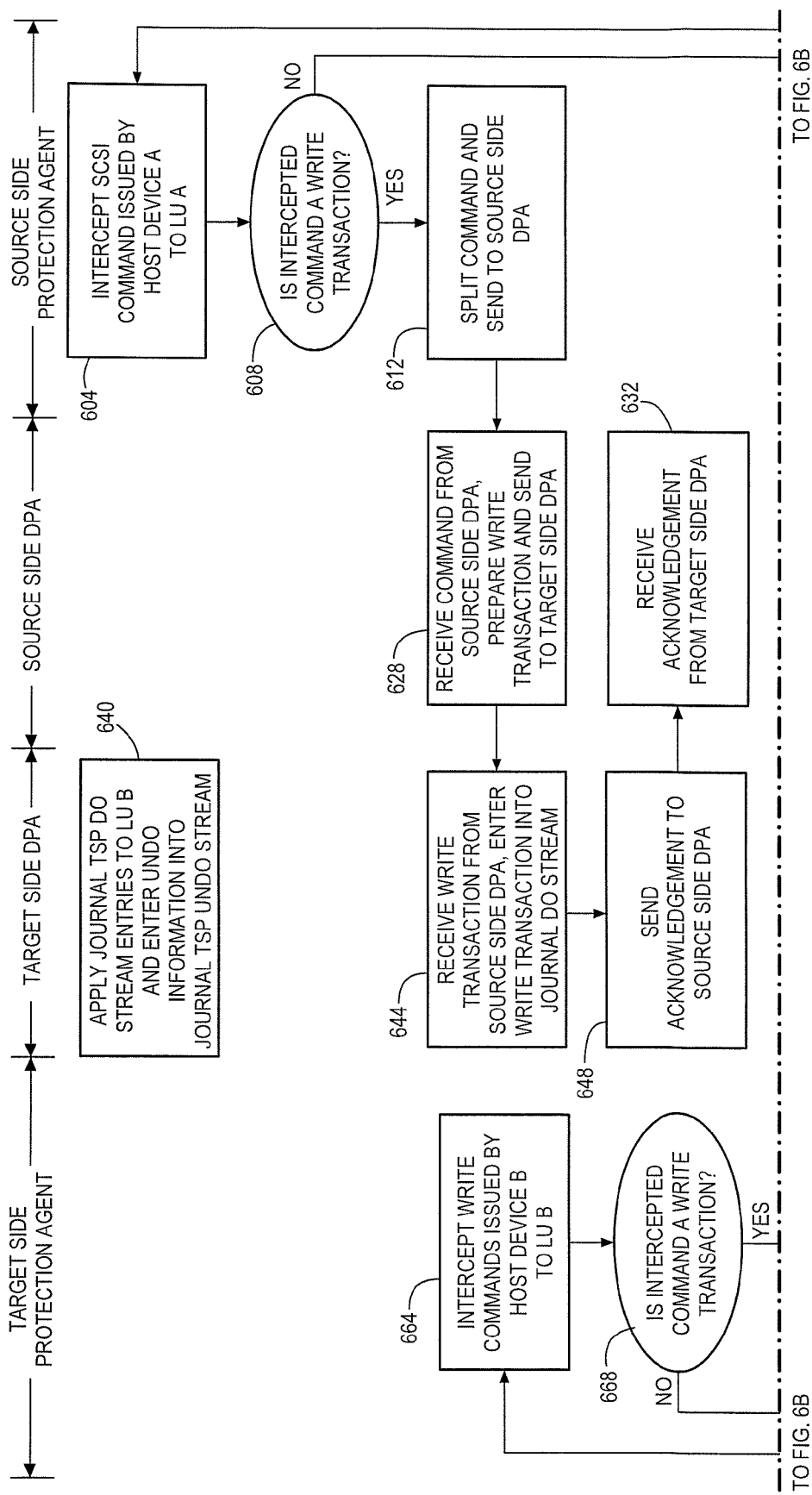
FIG. 6 is a simplified flowchart of a data protection method during a data recovery mode, after completion of rollback, in accordance with an embodiment of the present invention.
Figure 6B:
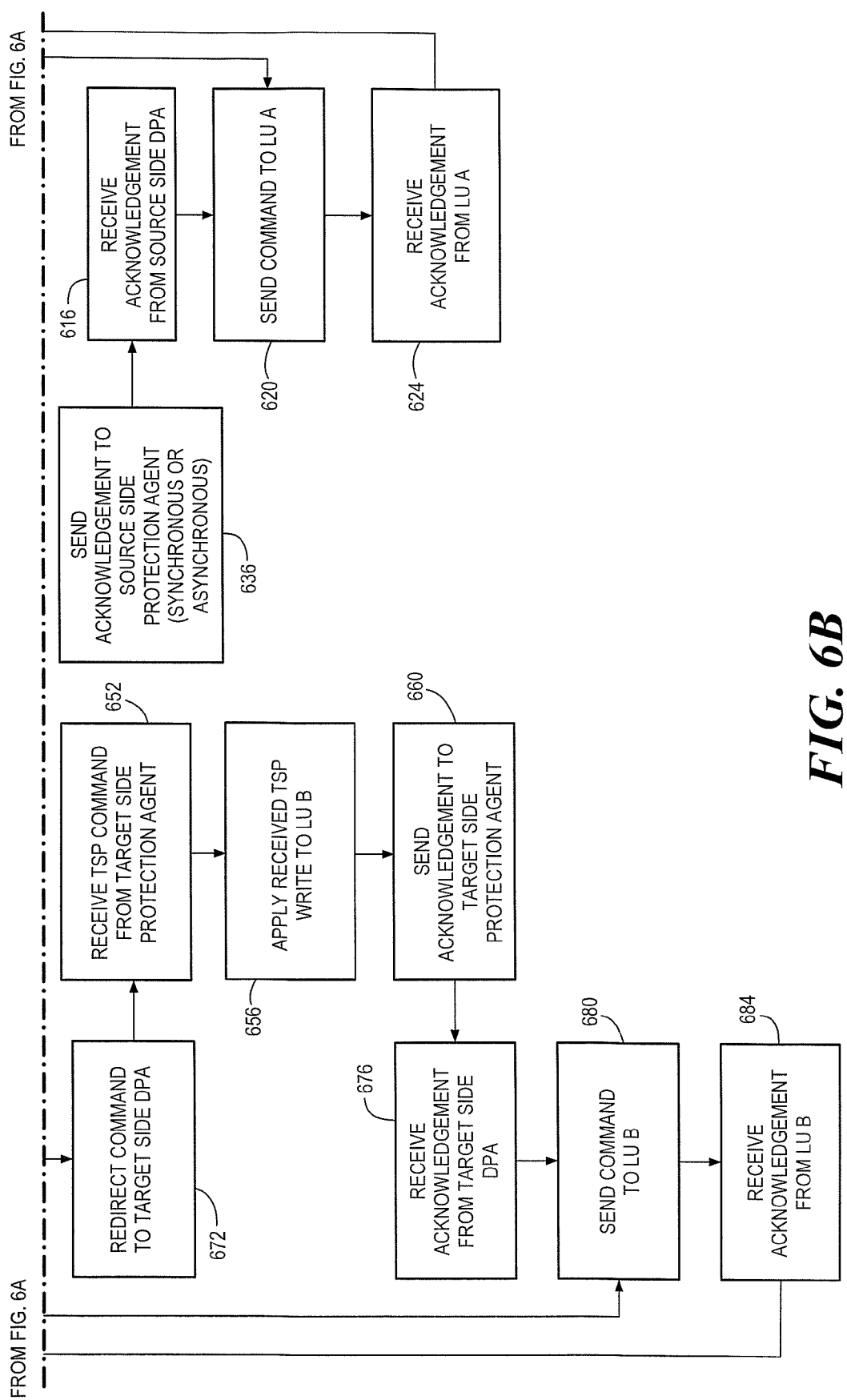

TABLES V and VI below summarize the behavior of the special protection components of system 100 during recovery mode, before and after the rollback is complete, in accordance with an embodiment of the present invention. Reference is also made to FIGS. 5 and 6, which are simplified flowcharts of data protection methods corresponding to TABLES V and VI, respectively. FIGS. 5 and 6 are divided into four columns. The leftmost column indicates steps performed by target side protection agent 164, the middle left column indicates steps performed by target side DPA 124, the middle right column indicates steps performed by source side DPA 112, and the rightmost column indicates steps performed by source side protection agent 144.

TABLE V

Recovery Functionality prior to Completion of Rollback

| System Component | Behavior |
|---|---|
| Target Side Agent 164 | Intercept SCSI commands issued to LU B (step 576). Redirect commands to DPA (step 580). |
| Target Side DPA 124 | Use UNDO stream of journal to roll back target storage system (step 540). Continue receiving write transactions from DPA 112 and enter these transactions into DO and DO METADATA streams without applying them to LU B (step 548). Enter TSP write transactions to TSP DO and TSP DO METADATA streams (step 564). Create a virtual image, to reply to read commands issued during the recovery process (step 572). |
| Source Side DPA 112 | As in production mode. |
| Source Side Agent 144 | As in production mode. |

TABLE VI

Recovery Functionality after Completion of Rollback

| System Component | Behavior |
|---|---|
| Target Side Agent 164 | Intercept SCSI commands issued to LU B (step 664). Redirect write transactions to DPA (step 672), and route read commands directly to LU B (step 680). |
| Target Side DPA 124 | Apply TSP write transactions to LU B, in the same manner that write transactions received from DPA 112 are applied in production mode; i.e., by entering data into TSP UNDO and TSP UNDO METADATA streams (step 640). Enter DO information and write transactions received from DPA 112 into DO and DO METADATA streams, without applying them to LU B (step 644). Apply TSP write transactions to LU B as they are received (step 656). |

TABLE VI-continued

Recovery Functionality after Completion of Rollback

| System Component | Behavior |
| --- | --- |
| Source Side DPA 112 | As in production mode. |
| Source Side Agent 144 | As in production mode. |

It is also noted in FIG. 5 that the steps performed by target side DPA 124 include three non-sequential groups; namely, (i) step 540, (i) steps 548 and 552, and (iii) steps 556, 560, 564, 568 and 572. Similarly in FIG. 6 target side DPA performs three non-sequential groups of steps; namely, (i) step 640, (ii) steps 644 and 648, and (iii) steps 652, 656 and 660.

Figure 7:
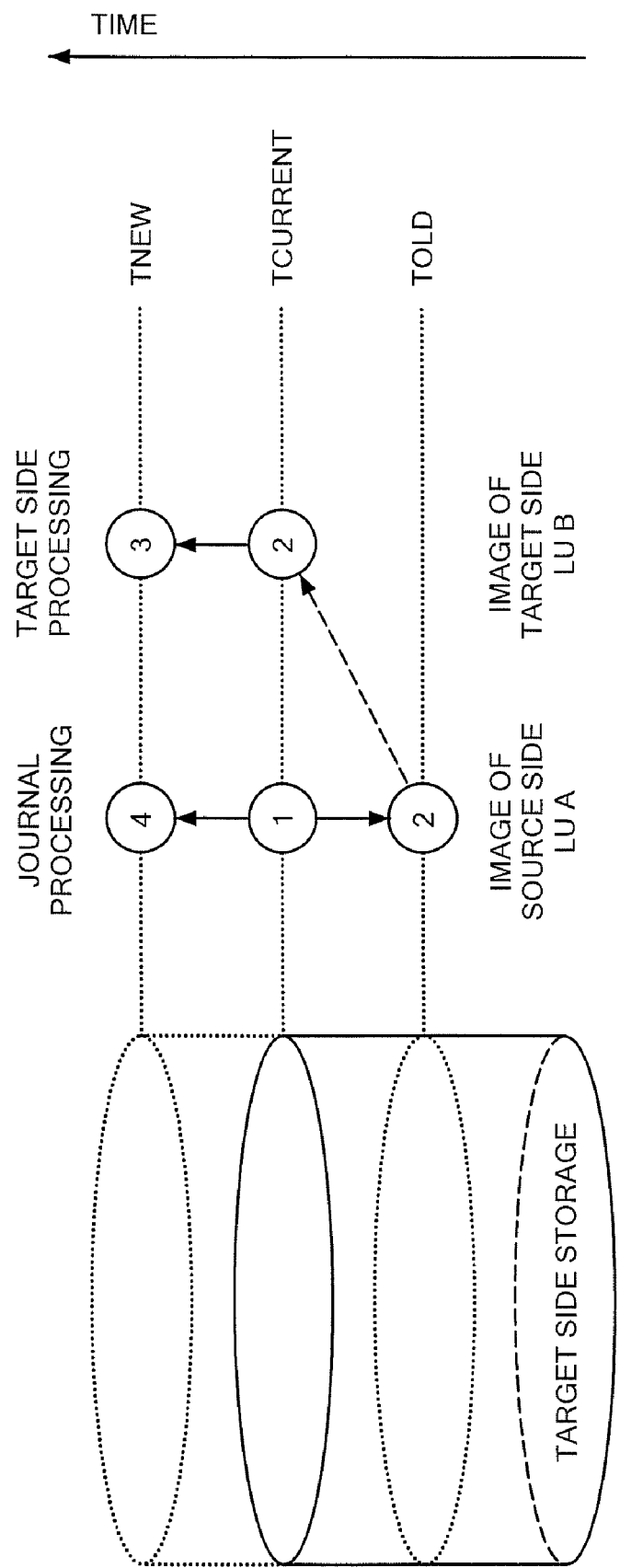
FIG. 7 is a simplified illustration of a time-line for tracking new processing of old data, in accordance with an embodiment of the present invention.

Reference is now made to FIG. 7, which is a simplified illustration of a time-line for tracking new processing of old data, in accordance with an embodiment of the present invention. FIG. 7 illustrates journal processor 180 bringing the timeline back to a previous time, TOLD, and journal processor 180 applying TSP writes to bring the timeline forward from time TCURRENT to time TNEW. As shown in FIG. 7, current data at time (1) is rolled back to old data at time (2). After rolling back the data to time (2), the rolled back data becomes the image upon which target side processing advances to new data at time (3); i.e., the target side processing is applied to data (2) and not to data (1).

The data at time (1) is a common image for LU A and LU B at the same point in time, TCURRENT. Similarly, the data at time (2) is a common image for LU A and LU B at time TOLD. Rolled back data at time (2) may be processed by TSP writes, while at the same time current data at time (1) is being processed by source side writes. As such, the data evolves along the path from time (2) to time (3) as it is processed by the target side, and along the path from time (2) to time (4) as it is processed by the source side. The data images at the source and target sides at time TNEW are thus different.

When the recovery process is completed, the user may (i) return to a normal production mode, or (ii) perform a failover by switching the replication direction. In case (i), LU B is rolled back to its state at time (2), and the write transactions along the path from (2) to (4) are applied to LU B, so as to bring LU B to the same image as LU A. Conversely, in case (ii), LU B is maintained at its state at time (3), and its data is copied from the target side to the source side so as to bring LU A to the same image as LU B.

It may be appreciated that after rolling back the UNDO data stream to LU B, the state of the target side storage is substantially identical to the state that LU A was in at an earlier point in time. However, after applying TSP writes, the state of LU B is then in a new state that is different from the earlier state of LU A. As such, in order to return to a normal production mode, and ensure that LU B is a copy of LU A, DPA 124 undoes the TSP writes that were written to LU B using the TSP undo stream, and then returns to its normal production mode and begins applying the data that was written into the DO stream. The DO stream includes all write transactions that were undone while LU B was rolled back. Additionally, the DO stream includes new journal entries that were received from DPA 112 while DPA was in recovery mode. Similarly, protection agent 164 returns to its production mode by beginning to fail I/O requests issued by host 116.

Alternatively, the user want to perform a failover; i.e., to make LU B in its current state a production LU and ensure that LU A is a copy of LU B. In this case the write transactions in the DO stream that correspond to a point in time subsequent to the recovered point in time are ignored. Additionally, the TSP writes that were applied to LU B during the recovery process are applied to LU A. Thereafter, the replication direction changes. Specifically, DPA 124 and protection agent 164 begin behaving in accordance with source site behavior, and DPA 112 and protection agent 144 begin behaving in accordance with target site behavior.

It may be appreciated that in order to provide failover capability, in which the roles of the production site and the backup site are switched, it is desirable that the source side has the necessary system components to function as a target side, and vice versa. Thus, in an embodiment of the present invention, the source side includes its own journal LU 184 and journal processor 188, as indicated with dotted lines in FIG. 1.

Figure 8:
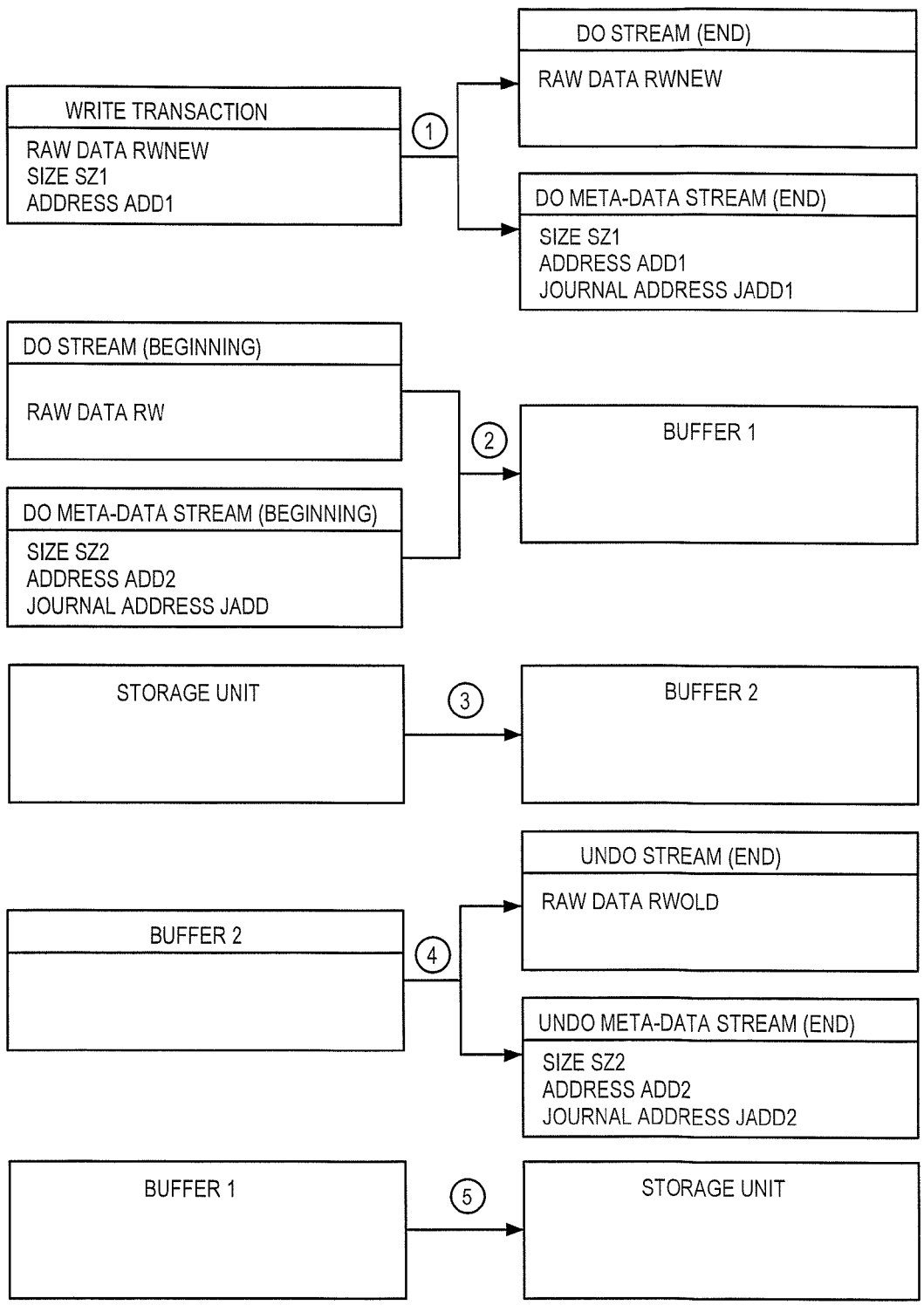
FIG. 8 is a simplified illustration of a five-stage journaling process for continuous data replication, in accordance with an embodiment of the present invention.

Referring back to TABLE I, it may be appreciated that during normal data replication, for each write transaction received from a production site, there are five I/O operations performed at a backup site. Reference is now made to FIG. 8, which is a simplified illustration of a 5-stage journaling process for continuous data replication, in accordance with an embodiment of the present invention. The five steps shown in FIG. 8 correspond respectively to the five steps listed in TABLE I. For the sake of clarity, FIG. 8 only shows three meta-data elements; namely, a size, a journal address and a storage address. It may be appreciated that the meta-data in the DO METADATA and UNDO METADATA streams includes an ID, a time, and other attributes.

In accordance with an embodiment of the present invention, the meta-data for each transaction is of a fixed size, typically 30 bytes. The raw data varies in size, typically averaging around 10 KB per transaction.

As write transactions performed at a production site vary in frequency, and as each write transaction at the production site normally requires five I/O transactions at the backup site, it may be appreciated that the size of the DO stream grows and shrinks accordingly. When the I/O rate is low, the beginning of the DO stream is close to the end of the DO stream. In such case, it is possible to keep all write transactions between the beginning and the end of the DO stream in memory, and there is no need to read the beginning of the DO stream for every new transaction received in the backup site. As such, step 2 may be skipped.

Figure 9:
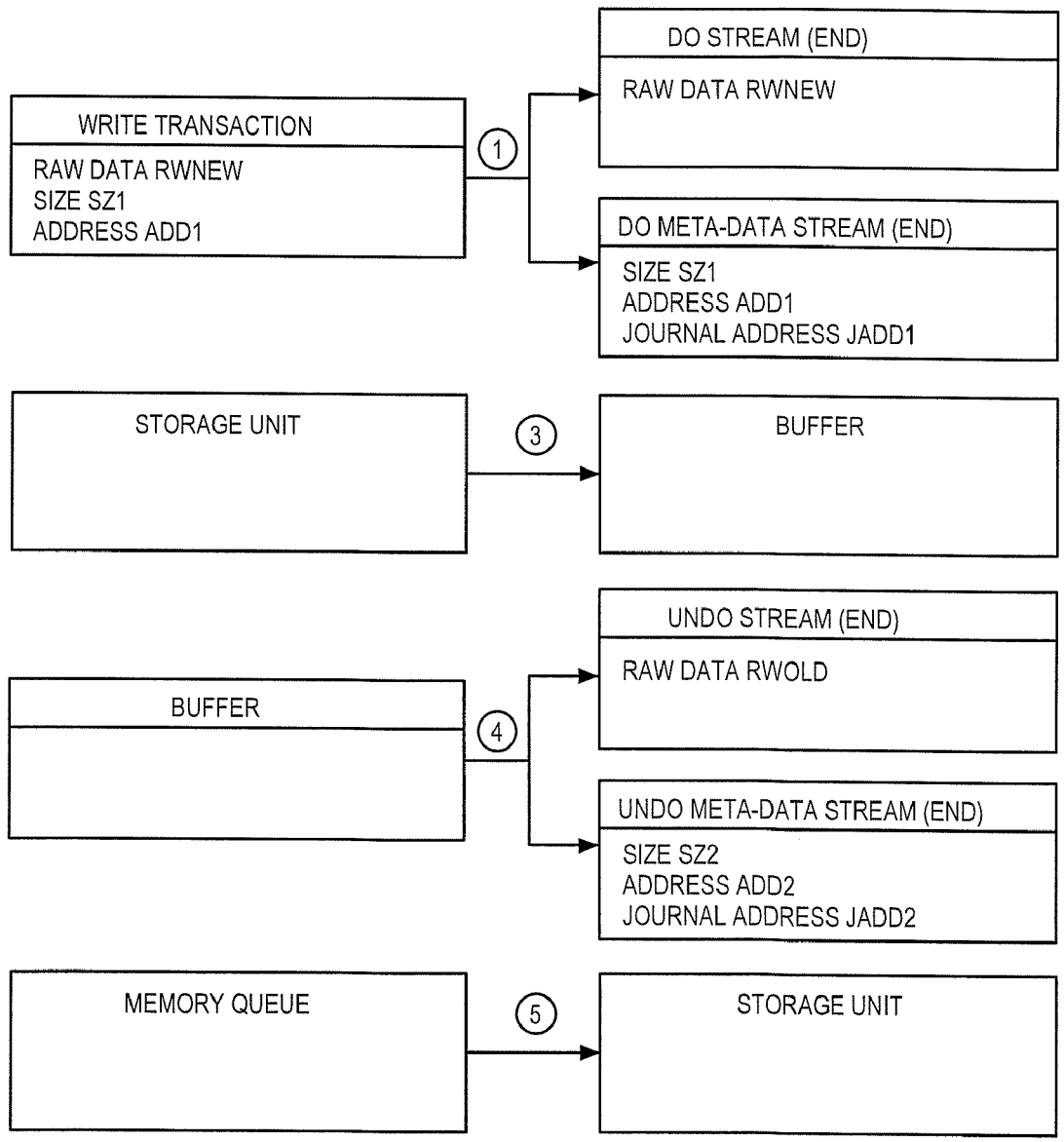
FIG. 9 is a simplified illustration of a four-stage journaling process for continuous data replication, for use when an I/O data rate is low, in accordance with an embodiment of the present invention.

Reference is now made to FIG. 9, which is a simplified illustration of a 4-stage journaling process for continuous data replication, for use when an I/O data rate is low, in accordance with an embodiment of the present invention. The first step in FIG. 9 copies the write transaction to the end of the DO stream and the end of the DO METADATA stream, as in the 5-stage journaling process. Unlike, the 5-stage journaling process, though, instead of reading write transaction data from the beginning of the DO and DO METADATA streams, the 4-stage journaling process takes advantage of the fact that the write transaction that was just received at the backup site is still resident in memory. For this write transaction, steps 3-5 are performed, as indicated in FIG. 9.

However, during the steps 3-5 distribution of the write transaction that was just received, it is possible that a new transaction arrives at the backup site. In order to keep pace with the arriving transaction, as each write transaction is entered into the ends of the DO and DO METADATA streams, the write transaction is written into the end of a queue in memory. In accordance with an embodiment of the present invention, the queue in memory is handled similar to the way the DO stream is handled; namely, each received write is appended to the end of the queue, and when a write transaction is distributed according to steps 3-5, a subsequent write transaction is taken from the beginning of the queue. Effectively, the queue corresponds to a cached DO stream.

The 4-stage journaling process is used until the queue in memory is full, at which point the normal 5-stage journal processing is resumed. Also in the event of a disaster, the normal 5-stage journal processing is resumed. In order to resume the 5-stage journal processing, it is important to identify the last write in the DO stream that was written. As such, even during the 4-stage journal processing, the pointers to the first and last write transactions in the DO stream are updated.

Conversely, when the I/O rate is high, in order to control the size of the DO stream and ensure that it does not overflow its disk allotment, the present invention switches from the normal 5-stage mode to a faster 3-stage mode whenever the DO stream reaches a large percentage of its maximum capacity, typically 80%. The present invention afterwards switches back from the faster 3-stage mode to the normal 5-stage mode whenever the DO stream is reduced to a smaller percentage of its maximum capacity, typically 75%.

The 3-stage mode eliminates steps 3 and 4 from the normal mode; namely, the steps that record the UNDO information. As such, rollback of the backup storage unit to its state at the times of those transactions processed with the 3-stage mode is not possible.

Figure 10:
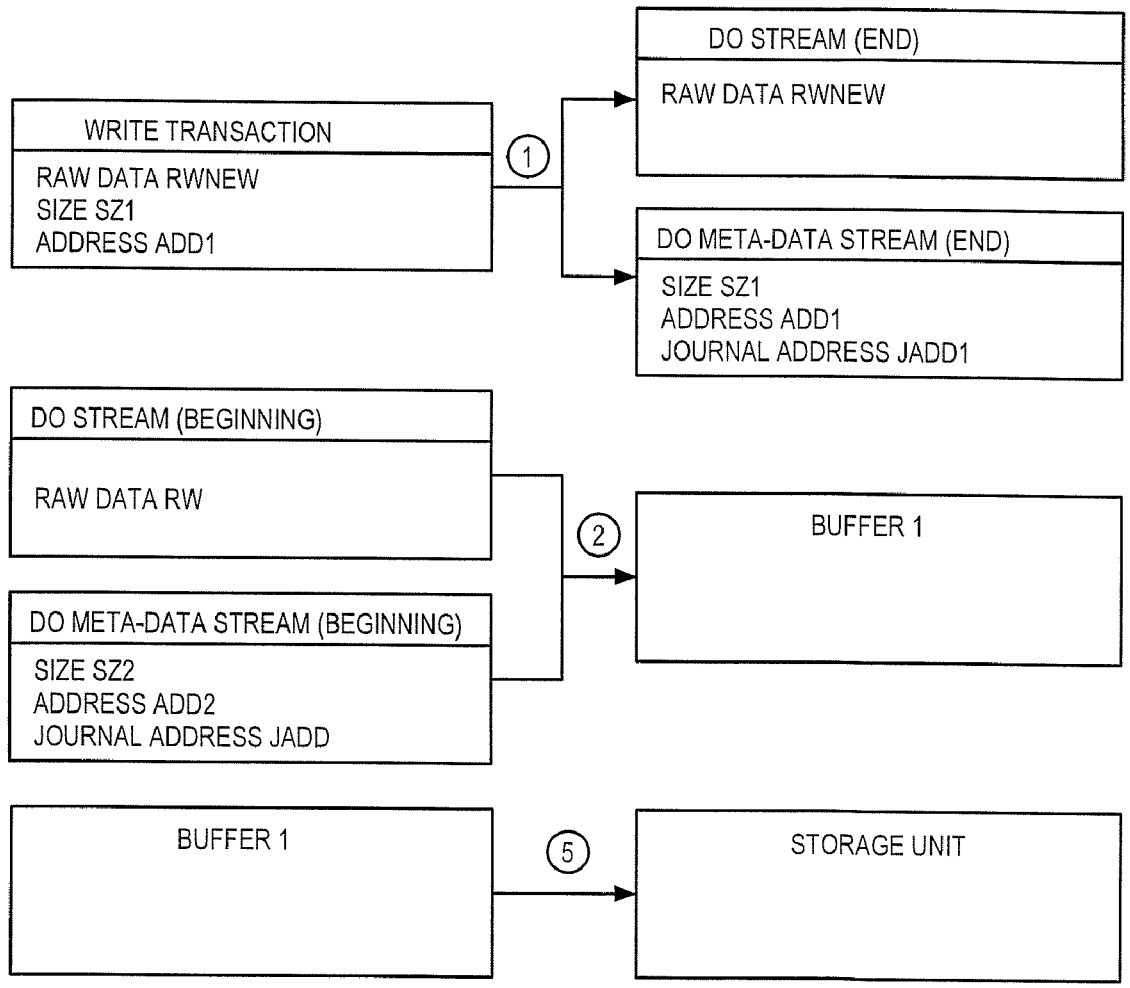
FIG. 10 is a simplified illustration of a three-stage journaling process for continuous data replication, for use when an I/O data rate is high, in accordance with an embodiment of the present invention.

Reference is now made to FIG. 10, which is a simplified illustration of a 3-stage journaling process for continuous data replication, for use when the DO stream is near its maximum capacity, in accordance with an embodiment of the present invention.

TABLE VII summarizes the relative pros and cons of each of the journaling processes described hereinabove.

TABLE VII

Pros and Cons of Journaling Processes

| Journaling Process | Pros | Cons |
| --- | --- | --- |
| 3-Stage Journaling | Fastest replication time | Long time to recover to current time |
| 4-Stage Journaling | Moderate replication time; Full data recovery capability | Only able to be used as long as the beginning and the end of the DO stream are close |
| 5-Stage Journaling | Full data recovery capability | Slowest replication time |

One data replication strategy is the set of automated rules for controlling when a data replication system transitions between 5-stage, 4-stage and 3-stage journal processing. As mentioned hereinabove, transitions from 5-stage to 3-stage journaling, and from 3-stage back to 5-stage journaling, may be controlled based on the current size of the DO stream. Transitions from 5-stage to 4-stage journaling may be automated to occur when the beginning and end of the DO stream are close; and transitions from 4-stage back to 5-stage journaling may be automated to occur when the memory queue reaches its capacity.

Figure 11:
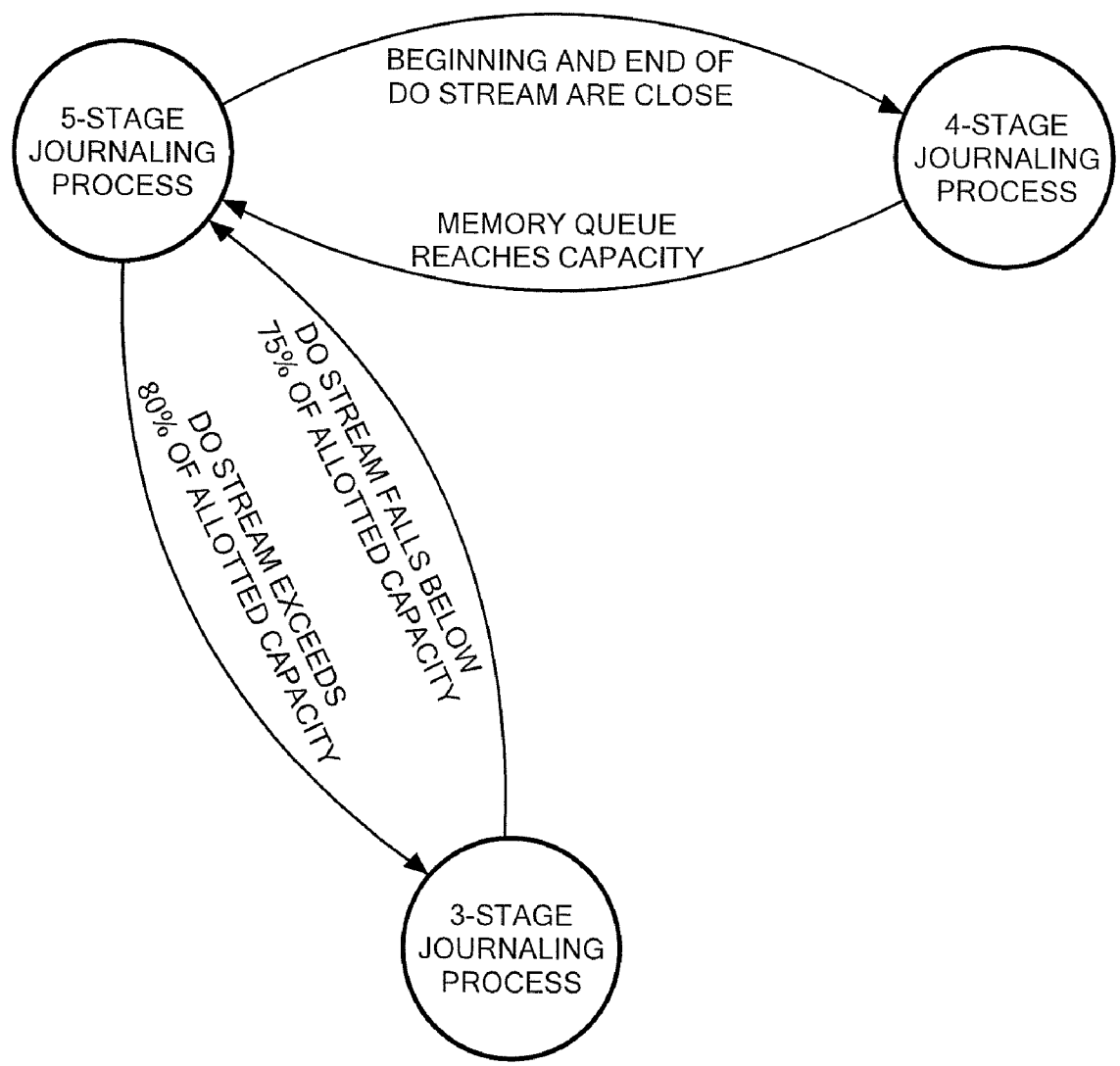
FIG. 11 is a simplified state diagram of transitions between 5-stage, 4-stage and 3-stage journal processing, in accordance with an embodiment of the present invention.

Reference is now made to FIG. 11, which is a simplified state diagram of transitions between 5-stage, 4-stage and 3-stage journal processing, in accordance with an embodiment of the present invention. Shown in FIG. 11 are three nodes, representing each of the journaling processes, and directed edges between the nodes corresponding to rules that govern transitions therebetween. As shown in FIG. 11, a 5-stage to 3-stage transition occurs when the size of the DO stream exceeds 80% of its allotted capacity, and a 3-stage to 5-stage transition occurs when the size of the DO stream falls under 75% of its allotted capacity. Similarly, a 5-stage to 4-stage transition occurs when the beginning and end of the DO stream are close; and a 4-stage to 5-stage transition occurs when the memory queue reaches its capacity.

It will be appreciated by those skilled in the art that using 4-stage journaling enables a data replication system to keep pace with higher I/O rates than can be handled when using 5-stage journaling. If the system is currently using 5-stage journaling and the I/O rate is higher than can be handled, a lag increases until the system necessarily transitions to the 3-stage journaling process. However, if the system can catch up with the lag, empty the DO stream and transition to a 4-stage journaling process, then the system can accommodate higher I/O rates before transitioning back to the 5-stage journaling process.

In this regard, it is noted that in general, if the system cannot keep pace with I/O rates using a 4-stage journaling process, then it most probably cannot keep pace using a 5-stage journaling process, and in either case the system would have to transition to a 3-stage journaling process. However, since the I/O rate changes continuously, a transition from 4-stage journaling to 5-stage journaling does not necessarily push the system to 3-stage journaling.

Figure 12:
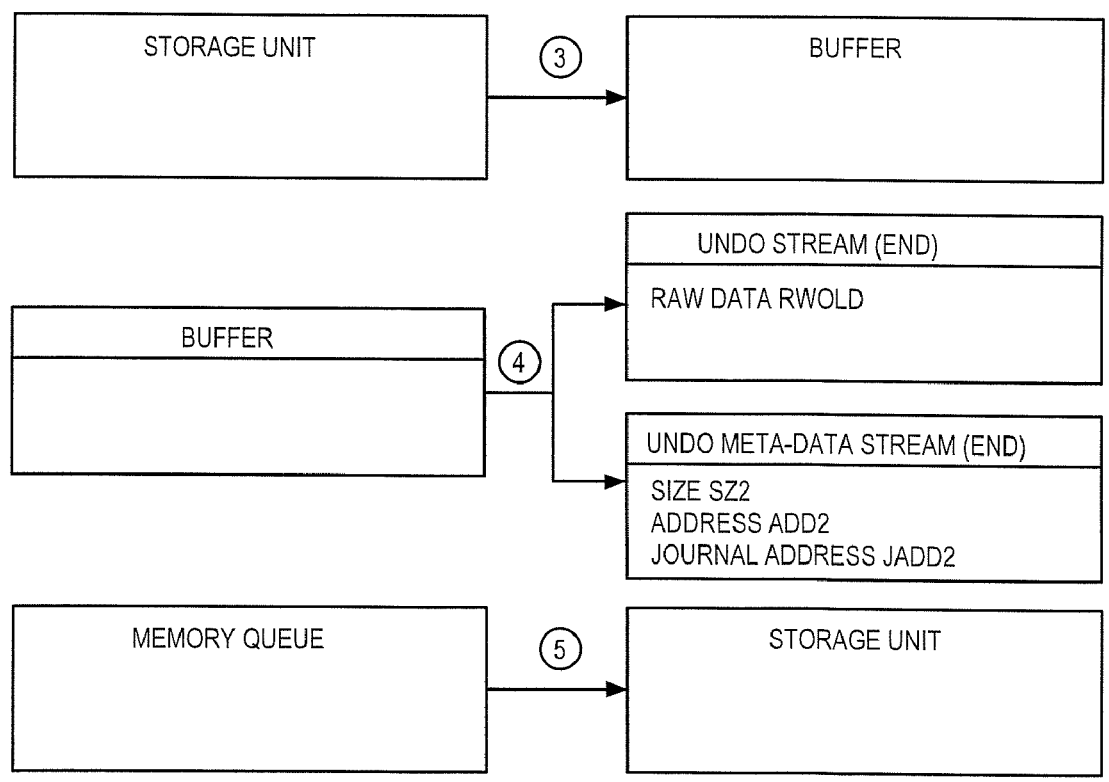
FIG. 12 is a simplified illustration of a variant of the three-stage journaling process shown in FIG. 10, which may be used in an alternative embodiment of the present invention.

Reference is now made to FIG. 12, which is a simplified illustration of a variant of the three-stage journaling process shown in FIG. 10, which may be used in an alternative embodiment of the present invention. The alternative 3-stage journaling proceeds according to the last three stages of the 4-stage journaling process. That is, the stage of writing to the DO stream is skipped within 4-stage journaling, for the alternative embodiment of 3-stage journaling. When performing 4-stage journaling, the backup site DPA (element 124 of FIG. 1) can return an acknowledgement to the production site DPA (element 112 of FIG. 1) immediately after the first stage, when the write transaction is written to the DO stream. However, when performing the alternative 3-stage journaling, the backup site DPA must wait until the write transaction is written to storage, before it can return an acknowledgement to the production site DPA. Since the last three stages of 4-stage journaling can be performed in a separate thread than the thread that performs the first stage, the alternative 3-stage journaling may result in a longer time lag between the source and target sites.

In another aspect of the invention, a continuous data protection (CDP) system having journaling includes bottleneck detection and/or bottleneck processing. As used herein, a bottleneck refers to a particular processing step(s) or data exchange in which time or other parameter exceeds an expected or required value causing system to operate in less than optimal way. With this arrangement, the CDP system performance issues can be identified and addressed. While the exemplary embodiments are primarily shown and described in conjunction with particular architectures, configurations, and interactions, it is understood that bottleneck detection/processing is desirable for data storage systems in general for which efficient performance is desired.

Figure 13:
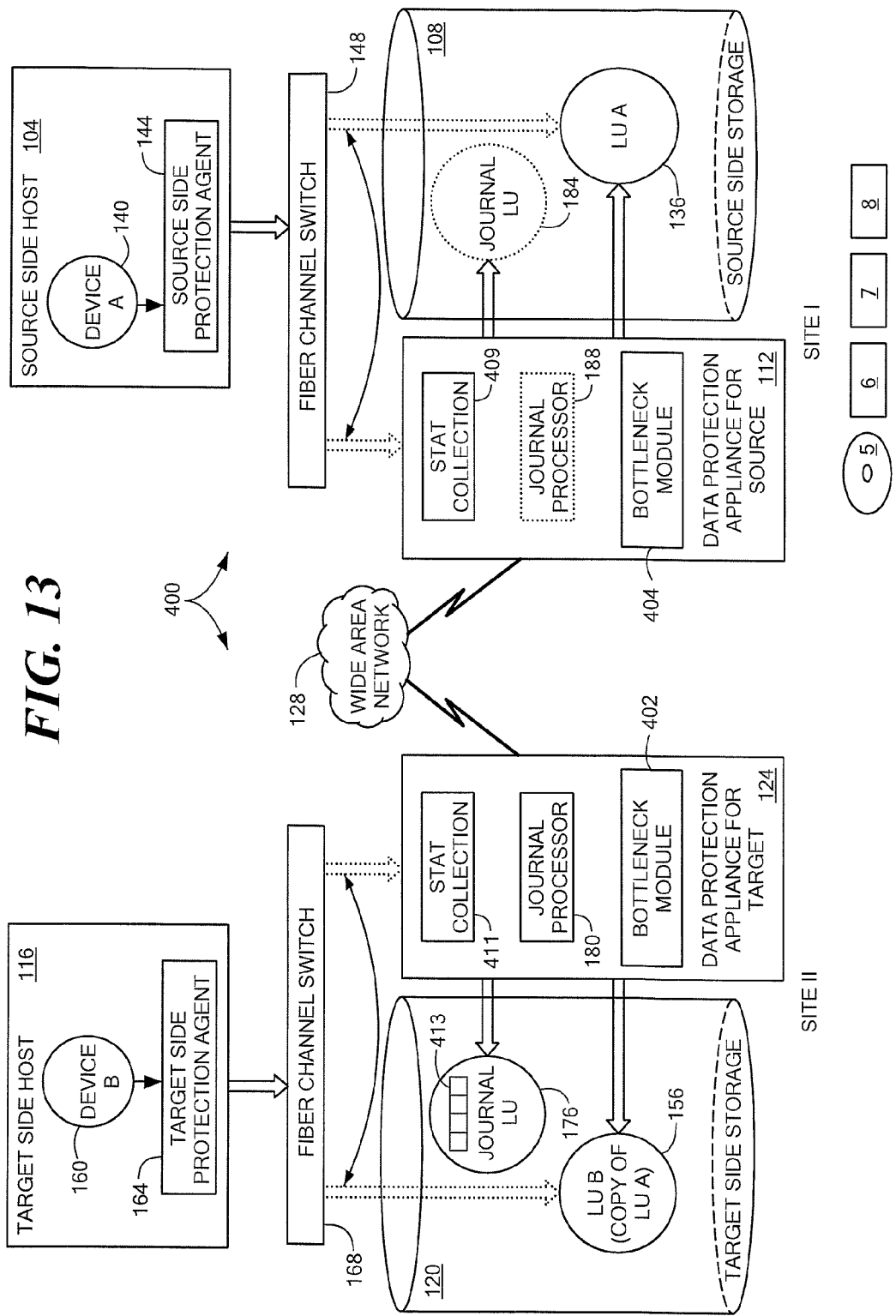
FIG. 13 is a schematic representation of a continuous data protection system having journaling with bottleneck detection.

FIG. 13 shows an exemplary system 400 having bottleneck processing in accordance with exemplary embodiments of the invention. The system 400 has some similarity with the system 100 of FIG. 1 with the addition of a bottleneck module 402 in the target side data protection appliance, where like reference numbers indicate like elements. The source side data protection appliance can also include a bottleneck module 404. As described in detail below, the bottleneck module 402 can identify system bottlenecks and can address the identified bottlenecks by providing information to the user and/or automatically making (configuration) changes in the system.

A statistics collection module 409, 411 collects statistics during operation of the system, even when analysis is not requested. The statistics collection module 409 tracks incoming statistics and saves the current system statistics and status (e.g. which groups are in init, which are in highload etc. . . . ) every minute, for example, to a persistent stream of data (similar to the do and undo stream) referred to as a statistics stream 413. The statistics collection module 409, 411 runs on the data protection appliance and writes the collected statistics to the statistics data stream 413. In one embodiment, when the statistics stream becomes full, older entries are deleted.

The statistics stream 413 can contain entries for statistics for selected time intervals, e.g., every minute, and the collected information can be kept for a give time, such as several months.

Figure 14:
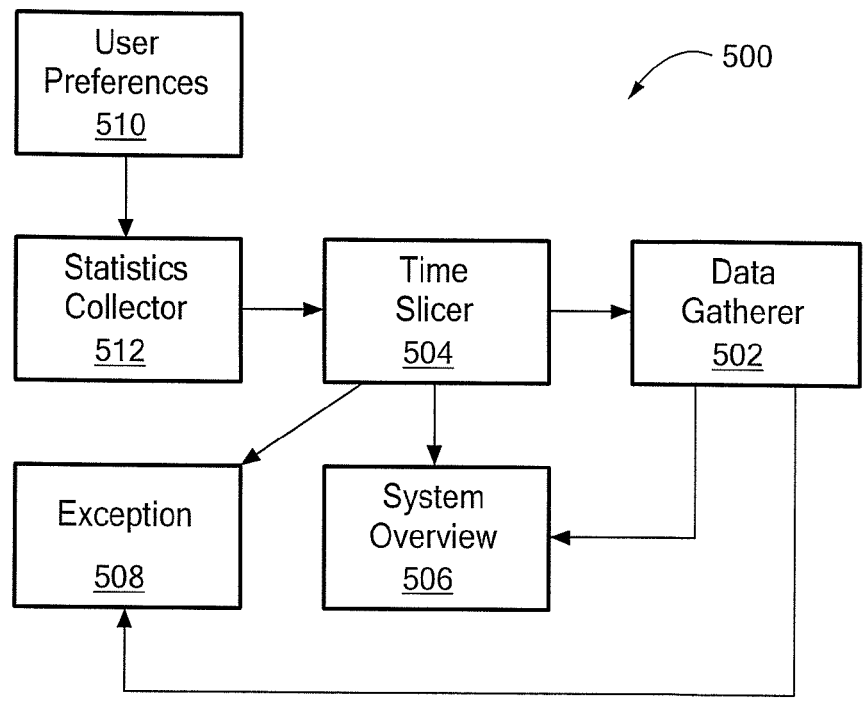
FIG. 14 is a functional block diagram for an exemplary bottleneck processing implementation.

FIG. 14 shows an exemplary system 500 for detecting bottlenecks in a CDP system having journaling in accordance with exemplary embodiments of the invention. It is understood that the system 500 can form a part of the bottleneck module 402 of FIG. 13. A data gatherer module 502 is connected to a time slicer module 504, a system overview module 506, and an exception module 508. The system 500 can also includes a user preference module 510 to receive user preference information and a statistics collection class/module 512.

The data gatherer module 502 collects statistics for a group/box/site in a given time period in different scopes. In an exemplary embodiment, statistics are collected from the statistics stream as data cannot stay resident in memory for bottleneck analysis over a long period of time without requiring huge amounts of memory. The time slicer module 504 decides on the basis of the working mode and the user preferences and the given statistics the time frames for which the data gatherer 502 is activated to collect statistics. The time slicer module 504 also activates printings through the system overview module 506 and the exception module 508.

The system overview module 506 prints the system overview in a given time frame based on the scope given by the time slicer module 504 (i.e. the accumulated statistics for the time period). The exception module 508, which is activated by the time slicer module 504, prints the exceptions/bottlenecks found in the given time frame. Processing begins from the statistics collector class which has a feed function to the time slicer module 504.

In general, printings include overview printings and exception printings. In an exemplary embodiment, statistics from the stream are read twice: first when using the time slicer module 504 to decide the time frames, and second, when building the data gatherer 502. In one embodiment, there can be a union of the data gatherer and the time slicer to one class to save processing resources. As the time slicer 504 handles the findings of the time frames it also handles the printings of the headings.

It is understood that the term printing refers to any type of output to a variety of formats and media. Exemplary printing mechanisms include text to a user interface, such as a display screen, output to a file, activation of an energy transmitter, such an audible or visible alarm, messages to target personnel, such as system administrators, and the like. The term printing should be construed broadly and not in anyway limited to notions of printing only on a paper medium.

The time slicer class serves as a selector working in various modes. In a user set time mode, the user selects a time frame. The time frame is passed to the data gatherer 502, which collects statistics over the user-selected time frame. The system overview 506 and exception 508 run over this time frame. In an initialization mode, a statistics accumulator collects data for the period of initialization. In a high loads mode, the system checks for the highloads that occur during the time frame indicated by the user. A total highload is made out of small highloads. A small highload occurs when a variable, which can be held in an accumulator, saying group is in highload mode is turned on in statistics stream. and the system starts registering it, say 5 minutes before (or from the last open pipe or from the last highload or if there was a system change). Total highload is a merge of small highloads. The total highload terminates when a pipe is opened and initialization is done (there are indications to state changes in the statistics stream) which means that replication has started. The system prints each small highload period and a system overview over the total highload. In a general mode the system analyzes the time frame in various different points of view:

System overview for the total time frame

Finding the initialization durations in the time frame and printing an overview for any one of them Finding the highloads in the time frame and printing overview for the Total highload Printing the 5 periods of 5 minutes in which the load of writing on the k-box was the largest.

The data gatherer 502 reads the statistics and stores them in different formats and calculations so the system can ask for them in the system overview 506 and exception module 508. Given a time frame and a set of accumulators (in most cases the set includes only one accumulator). In an exemplary embodiment, an accumulator is an element containing statistics data, which can be a system state, percentage of time performing specific task in a window of time, amount of data etc. The data gatherer 502 collects the following exemplary stats:

Total value—the sum of the values of the accumulators in the set (superposition).

Normalized total value—the sum of the values of the accumulators in the set normalized to the time frame.

Local Maximum—the local maximum in a given period of the accumulators' sum (normalized by Δtime).

The exception module 508 is initiated to analyze bottlenecks that occurred in long time frames, e.g., a week or a month. It is used in the working modes: user set time and general. The checking and printing is described below.

A slow WAN exception, i.e., detection by group printout for site and boxes, is detected by a high value, e.g., greater than a selected threshold, for various accumulators indicating how much network resources are available (vacancy), and how much time on average each message send waits in the queue due to network load.

A slow WAN bottleneck is detected by group, but generates data by site and box. A number of accumulators collect data on the network state. Whenever one of the variables exceeds a selected threshold, it means that a task takes too much time because of network delay.

In an exemplary embodiment, for each site that has a group having an exception, the system prints:

"WAN is too slow.

The bottleneck appeared on box: XX total wan performance on this box is: XX"

Another exception is a journal phase 1 bottleneck for a group. Phase 1 journaling is described above in detail. This bottleneck is detected by a high value, e.g., exceeds selected value for distribution Phase1 Total Time. For example, the exception occurs for when total time spent in writing phase1 data to the stream is more then 65%.

As described above, the first phase of the distribution is getting the data and writing it to the journal volume. Then, on the second phase, the data is distributed. The system reads the distributed data and then reads the corresponding undo data from the user-volume. The system keeps the undo data on the journal and writes the distributed data to the user-volume. If the journal volume is too slow, the exception is noted.

In an exemplary embodiment, the exception module prints:

"Journal volumes do not handle incoming writing rate:" and print the required journal volume speeds:

Journal volume should handle IO rate of (3× total incoming data+20% (for the specific consistency group)

Remote Volume should handle IO rate of (2× total data incoming to the system)

For fast distribution mode Journal volume should handle IO rate of (2× total data incoming to the system)

Remote Volume should handle IO rate of (20% more then incoming IO rate)

There is also a journal phase 2 bottleneck (group) exception in which a high value is detected for phase 2 total time. Phase 2 of the journal process, which is described above, refers to data reaching the target replication volumes. In an exemplary embodiment, the phase 2 exception is generated as follows: there is a bottleneck when spending more then 80% of the time in actual distribution of the data, and at least 10% of the time we are in fast forward mode (i.e. 3 phase distribution). If we are not in fast forward mode it is not a real bottleneck because it means we can handle the 5 phases. We also check phase1 is not a bottleneck because, if so, this is the first failure point.

Only when there is no phase 1 journal exception does the system look for the second phase exception that occurs when the system went too fast for forward distribution (neglected the saving of the undo data) and even though, spent too much time on the distribution process due to slow journal and user-volumes in the target site.

An exemplary printing is set forth below:

"Journal volumes and remote user volumes do not handle incoming writing rate" and print the required journal volume speeds as in the previous bottleneck.

Another bottleneck exception includes compression level is too high (box), i.e., total amount of CPU time used for compression has a high value (exceeds selected value). For example, if we use more then 70% of the clock cycles of all available CPUs just for compression we generate a compression bottleneck exception. If system automatically acts then compression level will be lowered.

Figure 15:
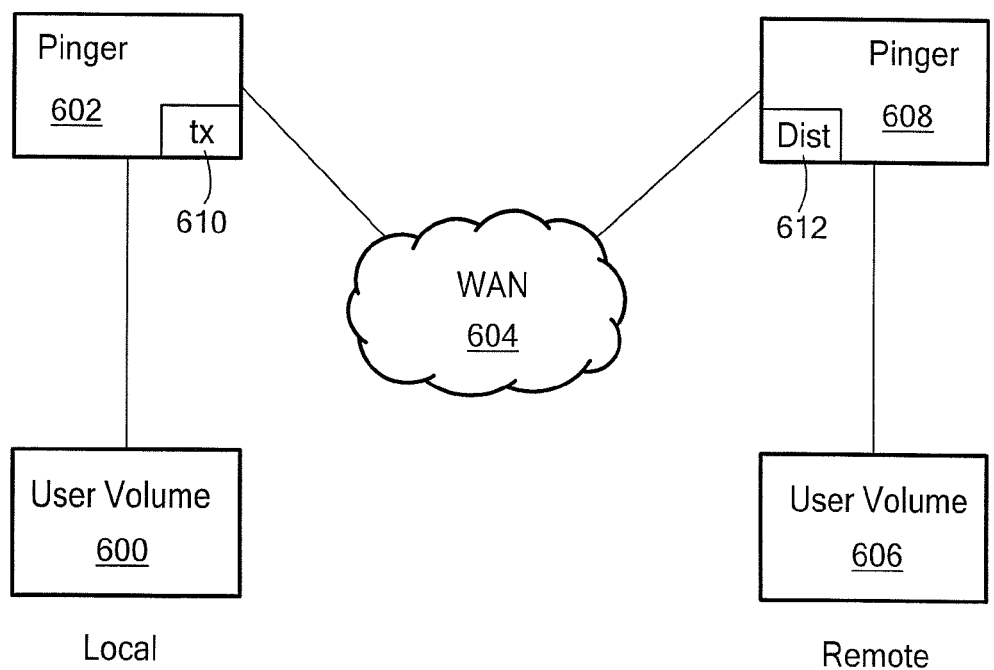
FIG. 15 is a schematic depiction of initialization processing.

An exemplary printing by the exception module includes:

"Compression level is too high. The machine resources cannot handle this current high rate" A further exception relates to so-called pinger and ponger processing during initialization prior to replication for making data in a remote site identical to data in a local site before replicating data in the remote volume, as shown in FIG. 15. A local user volume 600 interacts with a pinger module 602, which is coupled to a WAN 604. A remote user volume 606 is coupled to a remote user volume 608 and the WAN.

The pinger module 602 reads data from a part of the local user volume 600, signs the data (i.e. calculates a hash function of the data), and transmit the signature to the ponger module 608. The ponger module 608 reads from the same part of the remote user volume 606, signs the data, and compares the signatures. The ponger module 608 transmits to the ponger module 602 addresses of the user volume blocks where data differs. If there are differences, the pinger module 602 again reads the data from the local user volume 600 and transmits the data to the distributor 612 on the remote side through a transmitter 610.

During initialization process, the distributor processes initialization data from the pinger 602, which is written to the do stream while application data arriving in the local site is written to a temporary init stream. When the initialization data has been sent, the init stream and the do stream are united to create a big init snapshot and then the data is written to the user volume 606.

A further bottleneck exception is referred to as slow read source or pinger bottleneck check (group) defined as, since user expects the initialization process to be fast. In general, accumulators allow calculation of the average read speed for any windows of initialization. The system expects to be able to read from the source replication volumes during initialization in a rate of at least 10 MB/s, for example. If such a rate is not achieved then this exception is noted, such as "The reading from the local user volume is too slow during initialization."

Another exception is slow read target or ponger bottleneck check. The system expects to be able to read from the target replication volumes during initialization in a rate of at least 10 MB/s. If such a rate is not achieved then this exception is noted, such as "The reading from the remote user volume is too slow during initialization.

A further bottleneck exception is that the system spends too many resources handling the IOs incoming from the kernel if the thread handling the IOs takes 50%, for example of CPU, an exception is generated. This exception is generated if too much time is spent in the thread that handles the incoming writes. This might mean that the box is loaded and the system cannot handle the writes on time and delay the entire process, not returning acknowledgements on time, and regulating the application.

An exemplary printing includes:

"SAN target bottleneck. The appliance might be regulating the application" with the following values:

The incoming data=X MB/sec

Number of writes=n IOs/sec consider reducing box load"

Another bottleneck includes balance bottleneck (site) or box balance, which will be checked only if the time frame is larger than 30 min, for example. In one embodiment, the system sums the total data that passes through each box (data protection appliance). The system finds the box that handles the maximal value and the one that handles the minimal value. The system notes this exception if the total data going through the box with the maximal value is at least twice the total data going through the box with the minimal value.

The system can generate exceptions as:

"Boxes are not balanced"

Write the load on each box:

Boxes loads are:

Box: xxx load xxx Megabytes/sec"

Figure 16:
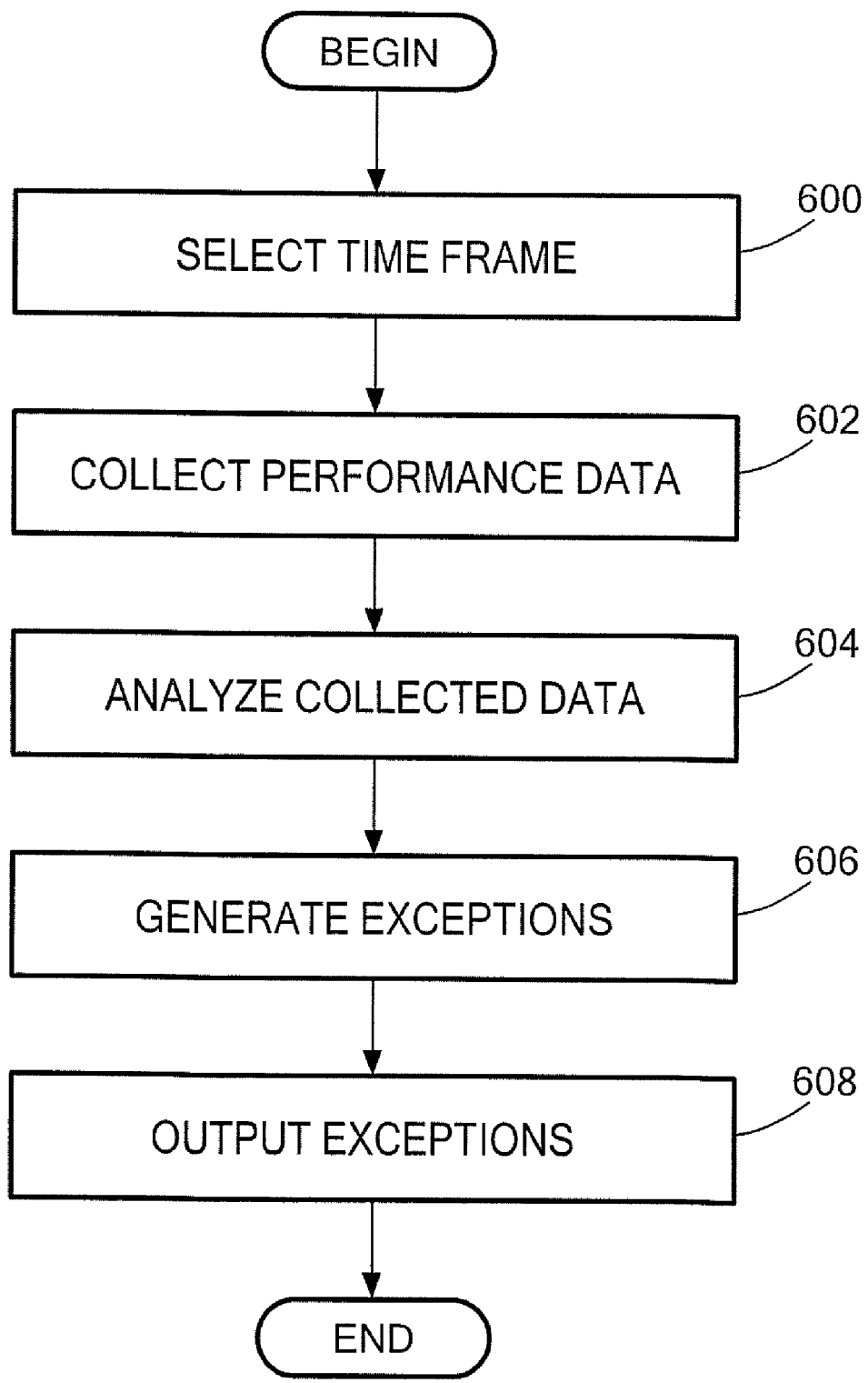
FIG. 16 is a flow diagram showing an exemplary sequence of steps to provide bottleneck processing.

FIG. 16 shows an exemplary sequence of steps for providing bottleneck processing in a CDP system having journaling in accordance with exemplary embodiments of the invention. In step 600, a time frame is selected, such as by the time slicer module 504, to collect performance information to detect various bottlenecks, such as slow WAN, slow phase 1 processing, slow phase 2 processing, compression level too high, pinger and/or ponger initialization processing issues, system does not handle the incoming load, and box balancing. In step 602, data is collected, such as by the data gatherer module 502. The collected data is analyzed in step 604 and in step 606 exceptions, i.e., where processing thresholds are violated, are generated. In step 608, the exceptions are output in a form to enable a user to perceive the exception information, such as by display on a screen.

It is understood that a wide range of possible actions can be taken to address bottlenecks and enhance system performance based upon the collected information. Such actions can be performed manually by a user and/or automatically by the system. In another embodiment, the system can request user approval for a suggested action.

In one exemplary scenario, in response to a slow WAN exception, where the compression level is OK, the system might increase the compression level. In response to a box imbalance exception, the system can move groups to run on other boxes (appliances). The system can lower the compression level if the compression level is too high, i.e., a compression exception was generated. In the event of a distribution exception, a system may replace a journal volume to a faster volume if a suitable volume is available in a pool of journal volumes. Further scenarios will be readily apparent to one of ordinary skill in the art.

Since detection and analysis are over a relatively long period, the system can detect that for example, on Sundays one consistency group is busy, while other groups are not. The system can then move the group to a different box (appliance). On Mondays, the system can move another consistency group to a box of its own.

It is understood that various collected times can be summed or otherwise combined to provide desired exception generation/processing. For example, if the five journal phase times are designated P1, P2, P3, P4, P4 and P5, these times can be added together, such as P2+P3+P4+P5, to provide a time for phase two to phase five processing. Many other such combinations will provide desired information. It is understood that any and all combinations of the phase time and other collected times are considered to be within the scope of the present invention.

Long term analysis in combination with local analysis can be used to change system configuration dynamically in order to achieve customer recover time requirements.

The methods and apparatus of exemplary embodiments of the invention may take the form, at least partially, of program code (i.e., instructions) embodied in tangible media, such as disks (element 5 in FIG. 13), CD-ROMs 6, hard drives 7, random access or read only-memory 8, or any other machine-readable storage medium, including transmission medium. When the program code is loaded into and executed by a machine, such as a computer, the machine becomes an apparatus for practicing the invention. The media can include portions in different system components, such as memory in a host, an application instance, and or, a management station. The methods and apparatus of the present invention may be embodied in the form of program code that may be implemented such that when the program code is received and loaded into and executed by a machine, such as a computer, the machine becomes an apparatus for practicing the invention. When implemented on processor, the program code combines with the processor to provide a unique apparatus that operates analogously to specific logic circuits. The program code (software-based logic) for carrying out the method is embodied as part of the system described below. In addition, it is understood that functionality can be implemented in various hardware, software, and combinations of hardware and software to meet the needs of a particular application without departing from the invention.

It is understood that the processing described in exemplary embodiments is not limited to use with the illustrative hardware and software configurations, rather, it may find applicability in any computing or processing environment and with any type of machine or set of machines that is capable of running a computer program. Processes may be implemented in hardware, software, or a combination. Processes may be implemented in computer programs executed on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform processes and to generate output information.

The exemplary system embodiments may be implemented, at least in part, via a computer program product, (e.g., in a machine-readable storage device, for execution by, or to control the operation of, data processing apparatus (e.g., a programmable processor, a computer, or multiple computers)). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network.

It is further understood that exemplary embodiments may be implemented in digital electronic circuitry, or in computer hardware, firmware, software, or in combinations thereof. Processing may be performed by one or more programmable processors executing one or more computer programs to perform the functions of the system. All or part of the system may be implemented as, special purpose logic circuitry (e.g., an FPGA (field programmable gate array) and/or an ASIC (application-specific integrated circuit)). In addition, processors suitable for the execution of a computer program include, by way of example, both general and special purpose microprocessors, and any one or more processors of any kind of digital computer. Generally, a processor will receive instructions and data from a read-only memory or a random access memory or both. Elements of a computer include a processor for executing instructions and one or more memory devices for storing instructions and data.

While the invention is shown and described in conjunction with a particular embodiment having an illustrative architecture having certain components in a given order, it is understood that other embodiments well within the scope of the invention are contemplated having more and fewer components, having different types of components, and being coupled in various arrangements. Such embodiments will be readily apparent to one of ordinary skill in the art. All documents cited herein are incorporated herein by reference.

What is claimed is:

1. A method, comprising:
   (a) receiving transactions comprising write data from a first data site to be backed up at a backup storage site;

(b) writing the write data to a first position in a do data stream in a phase one;
(c) writing metadata for the write data to a first position in a do metadata stream in the phase one,
(d) reading data from a second position in the do data stream in a phase two;
(e) reading metadata from a second position in the do metadata stream;
(f) reading data to be overwritten from a logical unit in the backup storage site in a phase three;
(g) writing the data to be overwritten to a first position in an undo data stream in a phase four;
(h) writing metadata for the data to be overwritten to an undo metadata stream,
(i) writing the write data to the logical unit in the backup storage site using the second field in the do metadata stream in a phase five,
(j) performing only four of the five phases, only three of the five phases, or five of the five phases based upon the input/output rate;
(k) collecting data movement timing information in a statistics data stream, wherein data is collected on a selected time interval;
(l) analyzing data in the statistics data stream using a processor to determine whether total time of processing in the phase one is greater than a first amount for identifying a first bottleneck,
(m) determining whether distribution of data in the phase two is taking more than second amount of time for identifying a second bottleneck;
(n) analyzing data in the statistics data stream to determine whether data compression is taking more than selected amount of processing cycles for identifying a third bottleneck; and
(o) determining whether initialization is taking more than selected amount of time for identifying a fourth bottleneck.

2. The method according to claim 1, further including reading data from the statistics data stream a first time to determine time frames and a second time to build a data gatherer module.

3. The method according to claim 1, further including displaying bottleneck information.

4. The method according to claim 1, further including: collecting time to transmit data from a local site to a remote site over a wide area network; and generating a slow WAN bottleneck exception if the collected information regarding the time to transmit the data exceeds a slow WAN threshold value.

5. The method according to claim 1, further including only identifying the second bottleneck when the first bottleneck is not present.

6. The method according to claim 1, further including identifying a further bottleneck when reading from a remove user volume takes more than a selected amount of time.

7. The method according to claim 1, further including examining the statistics data stream to determine whether handling input/output operations by a kernel takes more than a selected amount of processing cycles to identify an I/O thread bottleneck.

8. The method according to claim 1, further including a load imbalance bottleneck.

9. A data protection system for installation in a continuous data protection environment, comprising:
a bottleneck module comprising:
    a statistic collection module to collect data statistics during system operation;
    a data gatherer module to collect statistics for a given device(s) under control of a time slicer module using information in a user preference module; and
an exception module to output bottleneck information,
wherein the statistic collection module includes a data statistics stream to collect data for operations in the continuous data protection system including:
(a) receiving transactions comprising write data from a first data site to be backed up at a backup storage site;
(b) writing the write data to a first position in a do data stream in a phase one;
(c) writing metadata for the write data to a first position in a do metadata stream in the phase one,
(d) reading data from a second position in the do data stream in a phase two;
(e) reading metadata from a second position in the do metadata stream;
(f) reading data to be overwritten from a logical unit in the backup storage site in a phase three;
(g) writing the data to be overwritten to a first position in an undo data stream in a phase four;
(h) writing metadata for the data to be overwritten to an undo metadata stream;
(i) writing the write data to the logical unit in the backup storage site; and examining the information in the data statistics data stream for
analyzing data in the statistics data stream using a processor to determine whether total time of processing in the phase one is greater than a first amount for identifying a first bottleneck,
determining whether distribution of data in the phase two is taking more than second amount of time for identifying a second bottleneck;
analyzing data in the statistics data stream to determine whether data compression is taking more than selected amount of processing cycles for identifying a third bottleneck; and
determining whether initialization is taking more than selected amount of time for identifying a fourth bottleneck.

10. The system according to claim 9, wherein information from the statistics stream is read a first time to enable use by the time slicer module and second time to build the data gatherer module.

11. An article, comprising:
computer readable instructions stored on a storage medium to enable a machine to perform the steps of:
(a) receiving transactions comprising write data from a first data site to be backed up at a backup storage site;
(b) writing the write data to a first position in a do data stream in a phase one;
(c) writing metadata for the write data to a first position in a do metadata stream in the phase one,
(d) reading data from a second position in the do data stream in a phase two;
(e) reading metadata from a second position in the do metadata stream;
(f) reading data to be overwritten from a logical unit in the backup storage site in a phase three;
(g) writing the data to be overwritten to a first position in an undo data stream in a phase four;
(h) writing metadata for the data to be overwritten to an undo metadata stream,
(i) writing the write data to the logical unit in the backup storage site using the second field in the do metadata stream in a phase five, (j) performing only four of the five phases, only three of the five phases, or five of the five phases based upon the input/output rate;

(k) collecting data movement timing information in a statistics data stream, wherein data is collected on a selected time interval;

(l) analyzing data in the statistics data stream using a processor to determine whether total time of processing in the phase one is greater than a first amount for identifying a first bottleneck, (m) determining whether distribution of data in the phase two is taking more than second amount of time for identifying a second bottleneck;

(n) analyzing data in the statistics data stream to determine whether data compression is taking more than selected amount of processing cycles for identifying a third bottleneck; and (o) determining whether initialization is taking more than selected amount of time for identifying a fourth bottleneck.

12. The article according to claim 11, further including instructions for reading data from the statistics data stream a first time to determine time frames and a second time to build a data gatherer module.

13. The article according to claim 11, further including displaying bottleneck information.

14. The article according to claim 11, further including: collecting time to transmit data from a local site to a remote site over a wide area network; and generating a slow WAN bottleneck exception if the collected information regarding the time to transmit the data exceeds a slow WAN threshold value.

15. The article according to claim 11, further including only identifying the second bottleneck when the first bottleneck is not present.

16. The article according to claim 11, further including instructions for identifying a further bottleneck when reading from a remove user volume takes more than a selected amount of time.

17. The article according to claim 11, further including instructions for examining the statistics data stream to determine whether handling input/output operations by a kernel takes more than a selected amount of processing cycles to identify an I/O thread bottleneck.

18. The article according to claim 11, further including instructions for a load imbalance bottleneck.

* * * * *